(12) United States Patent
Forstall et al.

(10) Patent No.: US 8,519,972 B2
(45) Date of Patent: *Aug. 27, 2013

(54) WEB-CLIP WIDGETS ON A PORTABLE MULTIFUNCTION DEVICE

(75) Inventors: Scott Forstall, Los Altos Hills, CA (US); Stephen O. Lemay, San Francisco, CA (US); Imran Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 65 days.

This patent is subject to a terminal disclaimer.

(21) Appl. No.: 13/104,903

(22) Filed: May 10, 2011

(65) Prior Publication Data

US 2011/0210933 A1 Sep. 1, 2011

Related U.S. Application Data

(63) Continuation of application No. 11/850,011, filed on Sep. 4, 2007, now Pat. No. 7,940,250.

(60) Provisional application No. 60/937,993, filed on Jun. 29, 2007, provisional application No. 60/946,712, filed on Jun. 27, 2007, provisional application No. 60/879,469, filed on Jan. 8, 2007, provisional application No. 60/883,805, filed on Jan. 7, 2007, provisional application No. 60/879,253, filed on Jan. 7, 2007, provisional application No. 60/824,769, filed on Sep. 6, 2006.

(51) Int. Cl.
*G06F 3/041* (2006.01)
*G06F 3/048* (2013.01)

(52) U.S. Cl.
USPC ............................. 345/173; 345/156; 715/764

(58) Field of Classification Search
USPC .................. 345/156, 168, 173; 715/234, 235, 715/764, 765, 810, 866; 709/228; 455/566
See application file for complete search history.

(56) References Cited

U.S. PATENT DOCUMENTS

| 5,146,556 A | 9/1992 | Hullot et al. |
|---|---|---|
| 5,642,490 A | 6/1997 | Morgan et al. |
| 5,644,739 A | 7/1997 | Moursund |
| 5,726,687 A | 3/1998 | Belfiore et al. |
| 5,745,910 A | 4/1998 | Piersol et al. |
| 5,754,179 A | 5/1998 | Hocker et al. |

(Continued)

FOREIGN PATENT DOCUMENTS

| CA | 2349649 | 1/2002 |
|---|---|---|
| CN | 1257247 | 6/2000 |

(Continued)

OTHER PUBLICATIONS

Chang et al., "Animation: From Cartoons to the User Interface," UIST '93 Conference Proceedings, Atlanta, GA, Nov. 1993, 12 pages.

(Continued)

*Primary Examiner* — Stephen Sherman
(74) *Attorney, Agent, or Firm* — Morgan, Lewis & Bockius LLP

(57) ABSTRACT

In a computer-implemented method for use at a portable multifunction device with a touch screen display, a web page or portion thereof is displayed on the touch screen display. An activation of a web-clip widget creation icon is detected. In response to detecting the activation, a web-clip widget is created from the web page or portion thereof.

21 Claims, 24 Drawing Sheets

(56) References Cited

U.S. PATENT DOCUMENTS

| | | |
|---|---|---|
| 5,757,371 A | 5/1998 | Oran et al. |
| 5,760,773 A | 6/1998 | Berman et al. |
| 5,796,401 A | 8/1998 | Winer |
| 5,812,862 A | 9/1998 | Smith et al. |
| 5,825,349 A | 10/1998 | Maier et al. |
| 5,825,357 A | 10/1998 | Malamud et al. |
| 5,877,765 A | 3/1999 | Dickman et al. |
| 5,914,716 A | 6/1999 | Rubin et al. |
| 5,914,717 A | 6/1999 | Kleewein et al. |
| 5,923,327 A | 7/1999 | Smith et al. |
| 5,995,106 A | 11/1999 | Naughton et al. |
| 6,043,818 A | 3/2000 | Nakano et al. |
| 6,049,336 A | 4/2000 | Liu et al. |
| 6,072,486 A | 6/2000 | Sheldon et al. |
| 6,111,573 A | 8/2000 | McComb et al. |
| 6,133,914 A | 10/2000 | Rogers et al. |
| 6,144,863 A | 11/2000 | Charron |
| 6,195,094 B1 | 2/2001 | Celebiler |
| 6,229,542 B1 | 5/2001 | Miller |
| 6,275,935 B1 | 8/2001 | Barlow et al. |
| 6,278,454 B1 | 8/2001 | Krishnan |
| 6,313,853 B1 | 11/2001 | Lamontagne et al. |
| 6,323,846 B1 | 11/2001 | Westerman et al. |
| 6,353,451 B1 | 3/2002 | Teibel et al. |
| 6,377,698 B1 | 4/2002 | Cumoli et al. |
| 6,396,520 B1 | 5/2002 | Ording |
| 6,433,801 B1 | 8/2002 | Moon et al. |
| 6,545,669 B1 | 4/2003 | Kinawi et al. |
| 6,570,557 B1 | 5/2003 | Westerman et al. |
| 6,590,568 B1 | 7/2003 | Astala et al. |
| 6,677,932 B1 | 1/2004 | Westerman |
| 6,763,388 B1 | 7/2004 | Tsimelzon |
| 6,781,575 B1 | 8/2004 | Hawkins et al. |
| 6,931,601 B2 | 8/2005 | Vronay et al. |
| 6,934,911 B2 | 8/2005 | Salmimaa et al. |
| 6,970,749 B1 | 11/2005 | Chinn et al. |
| 6,976,210 B1 | 12/2005 | Silva et al. |
| 6,978,127 B1 | 12/2005 | Bulthuis et al. |
| 7,007,239 B1 | 2/2006 | Hawkins et al. |
| 7,071,943 B2 | 7/2006 | Adler |
| 7,093,201 B2 | 8/2006 | Duarte |
| 7,134,095 B1 | 11/2006 | Smith et al. |
| 7,231,229 B1 | 6/2007 | Hawkins et al. |
| 7,283,845 B2 | 10/2007 | De Bast |
| 7,355,593 B2 | 4/2008 | Hill et al. |
| 7,362,331 B2 | 4/2008 | Ording |
| 7,432,928 B2 | 10/2008 | Shaw et al. |
| 7,434,177 B1 | 10/2008 | Ording et al. |
| 7,487,467 B1 | 2/2009 | Kawahara et al. |
| 7,490,295 B2 | 2/2009 | Chaudhri et al. |
| 7,493,573 B2 | 2/2009 | Wagner |
| 7,506,268 B2 | 3/2009 | Jennings et al. |
| 7,509,588 B2 | 3/2009 | Van Os et al. |
| 7,512,898 B2 | 3/2009 | Jennings et al. |
| 7,526,738 B2 | 4/2009 | Ording et al. |
| 7,546,548 B2 | 6/2009 | Chew et al. |
| 7,546,554 B2 | 6/2009 | Chiu et al. |
| 7,561,874 B2 | 7/2009 | Wang et al. |
| 7,624,357 B2 | 11/2009 | De Bast |
| 7,642,934 B2 | 1/2010 | Scott |
| 7,683,889 B2 | 3/2010 | Rimas Ribikauskas et al. |
| 7,719,542 B1 | 5/2010 | Gough et al. |
| 7,730,401 B2 | 6/2010 | Gillespie et al. |
| 7,735,021 B2 | 6/2010 | Padawer et al. |
| 7,747,289 B2 | 6/2010 | Wang et al. |
| 7,783,990 B2 | 8/2010 | Amadio et al. |
| 7,805,684 B2 | 9/2010 | Arvilommi |
| 7,810,038 B2 | 10/2010 | Matsa et al. |
| 7,840,901 B2 | 11/2010 | Lacey et al. |
| 7,853,972 B2 | 12/2010 | Brodersen et al. |
| 7,856,602 B2 | 12/2010 | Armstrong |
| 7,940,250 B2 | 5/2011 | Forstall |
| 2001/0024195 A1 | 9/2001 | Hayakawa |
| 2001/0024212 A1 | 9/2001 | Ohnishi |
| 2002/0015024 A1 | 2/2002 | Westerman et al. |
| 2002/0015042 A1 | 2/2002 | Robotham et al. |
| 2002/0024540 A1 | 2/2002 | McCarthy |
| 2002/0038299 A1 | 3/2002 | Zernik et al. |
| 2002/0054090 A1 | 5/2002 | Silva et al. |
| 2002/0085037 A1 | 7/2002 | Leavitt et al. |
| 2002/0191029 A1 | 12/2002 | Gillespie et al. |
| 2003/0016241 A1 | 1/2003 | Burke |
| 2003/0030664 A1 | 2/2003 | Parry |
| 2003/0048295 A1 | 3/2003 | Lilleness et al. |
| 2003/0090572 A1 | 5/2003 | Belz et al. |
| 2003/0169298 A1 | 9/2003 | Ording |
| 2003/0184552 A1 | 10/2003 | Chadha |
| 2003/0184587 A1 | 10/2003 | Ording et al. |
| 2003/0200289 A1 | 10/2003 | Kemp et al. |
| 2003/0206195 A1 | 11/2003 | Matsa et al. |
| 2003/0206197 A1 | 11/2003 | McInerney |
| 2004/0103156 A1 | 5/2004 | Quillen et al. |
| 2004/0109025 A1 | 6/2004 | Hullot et al. |
| 2004/0121823 A1 | 6/2004 | Noesgaard et al. |
| 2004/0155909 A1 | 8/2004 | Wagner |
| 2004/0177148 A1 | 9/2004 | Tsimelzon |
| 2004/0215719 A1 | 10/2004 | Altshuler |
| 2004/0222975 A1 | 11/2004 | Nakano et al. |
| 2005/0005246 A1 | 1/2005 | Card et al. |
| 2005/0024341 A1 | 2/2005 | Gillespie et al. |
| 2005/0026644 A1 | 2/2005 | Lien |
| 2005/0039134 A1 | 2/2005 | Wiggeshoff et al. |
| 2005/0057524 A1 | 3/2005 | Hill et al. |
| 2005/0057548 A1 | 3/2005 | Kim |
| 2005/0060664 A1 | 3/2005 | Rogers |
| 2005/0060665 A1 | 3/2005 | Rekimoto |
| 2005/0091609 A1 | 4/2005 | Matthews et al. |
| 2005/0097089 A1 | 5/2005 | Nielsen et al. |
| 2005/0120142 A1 | 6/2005 | Hall |
| 2005/0134578 A1 | 6/2005 | Chambers et al. |
| 2005/0154798 A1 | 7/2005 | Nurmi |
| 2005/0229102 A1 | 10/2005 | Watson et al. |
| 2005/0250438 A1 | 11/2005 | Makipaa et al. |
| 2005/0251755 A1 | 11/2005 | Mullins et al. |
| 2005/0262448 A1 | 11/2005 | Vronay et al. |
| 2005/0275636 A1 | 12/2005 | Dehlin et al. |
| 2005/0289458 A1 | 12/2005 | Kylmanen |
| 2006/0026521 A1 | 2/2006 | Hotelling et al. |
| 2006/0026536 A1 | 2/2006 | Hotelling et al. |
| 2006/0051073 A1 | 3/2006 | Jung et al. |
| 2006/0055662 A1 | 3/2006 | Rimas-Ribikauskas et al. |
| 2006/0075355 A1 | 4/2006 | Shiono et al. |
| 2006/0080616 A1 | 4/2006 | Vogel et al. |
| 2006/0085763 A1 | 4/2006 | Leavitt et al. |
| 2006/0112335 A1 | 5/2006 | Hofmeister et al. |
| 2006/0123360 A1 | 6/2006 | Anwar et al. |
| 2006/0174211 A1 | 8/2006 | Hoellerer et al. |
| 2006/0197753 A1 | 9/2006 | Hotelling |
| 2006/0236266 A1 | 10/2006 | Majava |
| 2006/0238625 A1 | 10/2006 | Sasaki et al. |
| 2006/0242596 A1 | 10/2006 | Armstrong |
| 2006/0242604 A1 | 10/2006 | Wong et al. |
| 2006/0242607 A1 | 10/2006 | Hudson |
| 2006/0271864 A1 | 11/2006 | Satterfield et al. |
| 2006/0271874 A1 | 11/2006 | Raiz et al. |
| 2006/0277460 A1 | 12/2006 | Forstall et al. |
| 2006/0278692 A1 | 12/2006 | Matsumoto et al. |
| 2006/0282786 A1 | 12/2006 | Shaw et al. |
| 2006/0282790 A1 | 12/2006 | Matthews et al. |
| 2006/0284852 A1 | 12/2006 | Hofmeister et al. |
| 2006/0290661 A1 | 12/2006 | Innanen et al. |
| 2007/0013665 A1 | 1/2007 | Vetelainen et al. |
| 2007/0028269 A1 | 2/2007 | Nezu et al. |
| 2007/0030362 A1 | 2/2007 | Ota et al. |
| 2007/0055947 A1 | 3/2007 | Ostojic et al. |
| 2007/0067272 A1 | 3/2007 | Flynt et al. |
| 2007/0083911 A1 | 4/2007 | Madden et al. |
| 2007/0101297 A1 | 5/2007 | Forstall et al. |
| 2007/0124677 A1 | 5/2007 | de los Reyes et al. |
| 2007/0150830 A1 | 6/2007 | Ording et al. |
| 2007/0156697 A1 | 7/2007 | Tsarkova |
| 2007/0157089 A1 | 7/2007 | Van Os et al. |
| 2007/0177803 A1 | 8/2007 | Elias et al. |
| 2007/0177804 A1 | 8/2007 | Elias et al. |

| | | | |
|---|---|---|---|
| 2007/0180395 | A1 | 8/2007 | Yamashita et al. |
| 2007/0189737 | A1 | 8/2007 | Chaudhri et al. |
| 2007/0192741 | A1 | 8/2007 | Yoritate et al. |
| 2007/0243862 | A1 | 10/2007 | Coskun et al. |
| 2007/0245250 | A1 | 10/2007 | Schechter et al. |
| 2007/0266342 | A1 | 11/2007 | Chang et al. |
| 2007/0288860 | A1 | 12/2007 | Ording et al. |
| 2007/0288862 | A1 | 12/2007 | Ording |
| 2008/0005703 | A1 | 1/2008 | Radivojevic et al. |
| 2008/0082930 | A1 | 4/2008 | Omernick et al. |
| 2008/0122796 | A1 | 5/2008 | Jobs et al. |
| 2008/0125180 | A1 | 5/2008 | Hoffman et al. |
| 2008/0161045 | A1 | 7/2008 | Vuorenmaa |
| 2008/0168367 | A1 | 7/2008 | Chaudhri et al. |
| 2008/0168478 | A1 | 7/2008 | Platzer et al. |
| 2008/0182628 | A1 | 7/2008 | Lee et al. |
| 2008/0184112 | A1 | 7/2008 | Chiang et al. |
| 2008/0216017 | A1 | 9/2008 | Kurtenbach et al. |
| 2009/0007017 | A1 | 1/2009 | Anzures et al. |
| 2009/0064055 | A1 | 3/2009 | Chaudhri et al. |
| 2009/0128581 | A1 | 5/2009 | Brid et al. |
| 2009/0178008 | A1 | 7/2009 | Herz et al. |
| 2009/0199128 | A1 | 8/2009 | Matthews et al. |
| 2009/0295753 | A1 | 12/2009 | King et al. |
| 2010/0095238 | A1 | 4/2010 | Baudet |
| 2010/0105454 | A1 | 4/2010 | Weber et al. |
| 2010/0318709 | A1 | 12/2010 | Bell et al. |
| 2011/0007009 | A1 | 1/2011 | Ishihara et al. |

FOREIGN PATENT DOCUMENTS

| | | |
|---|---|---|
| CN | 1940833 | 4/2007 |
| EP | 0 322 332 A2 | 6/1989 |
| EP | 0 626 635 | 11/1994 |
| EP | 0 689 134 A1 | 12/1995 |
| EP | 0 844 553 | 5/1998 |
| EP | 1 143 334 | 10/2001 |
| EP | 1 231 763 A1 | 8/2002 |
| EP | 1 517 228 A2 | 3/2005 |
| EP | 1 744 242 | 1/2007 |
| FR | 2 819 675 | 7/2002 |
| GB | 2 329 813 | 3/1999 |
| JP | 09 073381 | 3/1997 |
| JP | 2000 163031 | 6/2000 |
| JP | 2002 149616 | 5/2002 |
| JP | 2004 070492 | 3/2004 |
| JP | 2004 164242 | 6/2004 |
| JP | 2004 341886 | 12/2004 |
| JP | 2005 309933 | 11/2005 |
| JP | 2005 352924 | 12/2005 |
| WO | WO 99/28815 | 6/1999 |
| WO | WO 99/38149 | 7/1999 |
| WO | WO 00/08757 A1 | 2/2000 |
| WO | WO 01/16690 A2 | 3/2001 |
| WO | WO 01/57716 A2 | 8/2001 |
| WO | WO 02/08881 | 1/2002 |
| WO | WO 02/13176 | 2/2002 |
| WO | WO 03/107168 A1 | 12/2003 |
| WO | WO 2004/063862 | 7/2004 |
| WO | WO 2005/041020 | 5/2005 |
| WO | WO 2006/020304 | 2/2006 |
| WO | WO 2006/020305 A2 | 2/2006 |
| WO | WO 2006/036069 | 4/2006 |
| WO | WO 2007/032972 | 3/2007 |
| WO | WO 2007/069835 A1 | 6/2007 |
| WO | WO 2007/094894 A2 | 8/2007 |

OTHER PUBLICATIONS

Agarawala et al. "Database Compendex/EI," Engineering Information, Inc., Apr. 27, 2006, 1 page.

Agarawala et al., "Keepin' it Real: Pushing the Desktop Metaphor with Physics, Piles and the Pen," CHI Proceedings 2006, Apr. 22-27, 2006, Montréal, Québec, Canada, pp. 1283-1292.

Andrew's Widgets, "Developing Dashboard Widgets—What the Heck is a Widget," http://andrew.hedges.name/widgets/dev/, printed Jan. 25, 2008, 9 pages.

Anonymous, "Asus Eee PC Easy Mode Internet Tab Options," asuseeehacks.blogspot.com, Nov. 10, 2007, 33 pages, http://asuseeehacks.blogspot.com/2007/11/asus-eee-pc-user-interface-tour.html.

Anonymous, "Desktop Icon Toy—History," Oct. 8, 2009, 2 pages, http://www.idesksoft.com/history.html.

Apple.com, "Tiger Developer Overview Series-Developing Dashboard Widgets," http://developer.apple.com/macosx/dashboard.html, printed Jun. 23, 2006, 9 pages.

Apple Computer, Inc., "Dashboard Tutorial," Apple Computer, Inc. © 2004,2006, 24 pages.

Berka, J., "iFuntastic 3 Opens Up New iPhone Functionality," ars technica, Aug. 30, 2007, http://arstechnica.com/journals/apple.ars/2007/08/30/ifuntastic-3-opens-up-new-iphone-functionality.

Chartier, D., "iPhone 1.1.3 Video Brings the Proof," ars technica, Dec. 30, 2007, http://arstechnica.com/journals/apple.are/2007/12/30/iphone-1-1-3-video-brings-the-proof.

CNET, "Video: Create custom widgets with Web Clip," CNET News, Aug. 8, 2006, 3 pages, http://news.cnet.com/1606-2-6103525.html.

Designing Interfaces.com, "Animated Transition," http://designinginterfaces.com/Animated_Transition, printed Oct. 16, 2006, 2 pages.

Edwards, A., "iPhone 1.1.3 Firmware Feature Gallery," Gear Live, Dec. 28, 2007, http://www.gearlive.com/news/article/q407-iphone-113-firmware-feature-gallery/.

FondantFancies, "Dash Clipping: Don't wait for Mac OS X 10.5 Leopard," fondantfancies.com, Aug. 8, 2006, 9 pages, http://www.fondantfancies.com/blog/3001239/.

Hesseldahl, A., "An App the Mac can Brag About," Forbes.com, http://www.forbes.com/2003/12/15/cx_ah_1215tentech_print.html, Dec. 15, 2003, 2 pages.

iPhone Hacks, "iPhone Firmware 1.1.1: Multi-Page SpringBoard Hack," Oct. 10, 2007, 4 pages, http://www.iphonehacks.com/2007/10/springboardhack.html, 2007.

iPhone Hacks, "SummerBoard for iPhone OS v1.1.1: iPhone Hack Enables Scrolling of iPhone's Home Screen," http://www.iphonehacks.com/2007/10/summerboard-v3.html, 2007.

Jazzmutant, "Jazzmutant Lemur," printed Nov. 16, 2005, 3 pages, http://64.233.167.104/search?q=cache:3g4wFSaZiXIJ:www.nuloop.c.

Jazzmutant, "The Lemur: Multitouch Control Surface", printed Nov. 16, 2005, 3 pages http://64233.167.104/search?q=cache:j0_nFbNVzOcJ:www.cycling7.

Macworld, "First Look: Leopard first looks: Dashboard," Aug. 9, 2006, 3 pages, http://www.macworld.com/article/52297/2005/08/leodash.html.

Macworld, "Whip up a widget," Macworld.com., Sep. 23, 2005, 5 pages, http://www.macworld.com/article/46622/2005/09/octgeekfactor.html.

Mello, Jr., J.,"Tiger's Dashboard Brings Widgets to New Dimension," http://www.nacnewsworld.com/story/42630.html, Mac New World, printed Jun. 23, 2006, 3 pages.

Microsoft, "Right-Clicking with a Pen," microsoft.com, Nov. 7, 2002, 3 pages, http://www.microsoft.com/windowsxp/using/tabletpc/learnmore/rightclick.mspx.

MountFocus Information Systems, "An Onscreen Virtual Keyboard: touchscreen, kiosk and Windows compatible," printed Dec. 19, 2007, 3 pages, http://www.virtual-keyboard.com.

Opera Software, "Welcome to Widgetize," Copyright © 2006 Opera Software ASA, 1 page, http://widgets.opera.com/widgetize.

Sadun, E., "Erica's Documentation: Applications and Utilities for the iPhone and iPod Touch," Copyright 2007, http://ericasadun.com/ftp/Deprecated/Documentation/Manual-0.04.pdf.

Thomas et al., "Applying Cartoon Animation Techniques to Graphical User Interfaces," ACM Transactions on Computer-Human Interaction, vol. 8, No. 3, Sep. 2001, pp. 198-222.

tuaw.com, "Springboard Scrolling," new page dot feature, Oct. 9, 2007, http://www.tuaw.com/gallery/springboard-scrolling/431347/.

tuaw.com, "Springboard Scrolling," mid-scroll, Oct. 9, 2007, http://www.tuaw.com/photos/springboard-scrolling/731348/.

tuaw.com. "Springboard Scrolling," mostly unpopulated page, Oct. 9, 2007, http://www.tuaw.com/photos/springboard-scrolling/431349/.

tuaw.com, "TUAW Hack: Mess with Your iPhone Settings," Dec. 18, 2007, http://www/tuaw.com/tag/SpringBoard/.

tuaw.com, "1.1.1 iPhone Multipage Springboard Hack," posted Oct. 9, 2007, http://www.tuaw.com/2007/10/09/1-1-1-iphone-multipage-springboard-hack/.

Wildarya, "iDesksoft Desktop Icon Toy v2.9," Oct. 16, 2007, 4 pages, http://www.dl4all.com/2007/10/16/idesksoft_desktop_icon_toy_v2.9.html.

International Search Report and Written Opinion dated May 8, 2008, in International Application No. PCT/US2007/077643, which corresponds to U.S. Appl. No. 11/850,011, 13 pages (Forstall).

International Search Report and Written Opinion dated Jun. 17, 2008, in International Application No. PCT/US2008/050431, which corresponds to U.S. Appl. No. 11/969,912, 15 pages (Lemay).

Invitation to Pay Additional Fees dated Nov. 16, 2009, in International Patent Application No. PCT/US2009/030225, which corresponds to U.S. Appl. No. 12/242,851, 4 pages (Herz).

International Search Report and Written Opinion dated Feb. 25, 2010, in International Application No. PCT/US2009/030225, which corresponds to U.S. Appl. No. 12/242,851, 20 pages (Herz).

International Preliminary Report on Patentability dated Jul. 15, 2010, in International Application No. PCT/US2009/030225, which corresponds to U.S. Appl. No. 12/242,851, 11 pages (Herz).

International Preliminary Report on Patentability dated Mar. 18, 2010, in International Application No. PCT/US2008/074625, which corresponds to U.S. Appl. No. 11/849,938, 7 pages (Chaudhri).

Office Action dated Sep. 14, 2009, in Australian Patent Application 2009100812, which corresponds to U.S. Appl. No. 11/459,602, 2 pages (Ording).

Office Action dated Sep. 14, 2009, in Australian Patent Application No. 2009100813, which corresponds to U.S. Appl. No. 11/459,602, 2 pages (Ording).

Office Action dated Apr. 2, 2009, in Canadian Patent Application No. 2,633,759, which corresponds to U.S. Appl. No. 11/459,602, 5 pages (Ording).

Office Action dated Dec. 10, 2009, in Canadian Application No. 2633759, which corresponds to U.S. Appl. No. 11/459,602, 6 pages (Ording).

Office Action dated Aug. 12, 2010, in Canadian Application No. 2633759, which corresponds to U.S. Appl. No. 11/459,602, 8 pages (Ording).

Office Action dated Mar. 30, 2010, in Chinese Application for Invention No. 200680053441.1, which corresponds to U.S. Appl. No. 11/459,602, 5 pages (Ording).

Office Action dated Nov. 12, 2010, in Chinese Application for Invention No. 200680053441.1, which corresponds to U.S. Appl. No. 11/459,602, 4 pages (Ording).

Office Action dated Oct. 27, 2009, in German Patent Application No. 11 2006 003 600.9, which corresponds to U.S. Appl. No. 11/459,602, 9 pages (Ording).

Office Action dated Oct. 13, 2008, in European Application No. 06 846 840.4, which corresponds to U.S. Appl. No. 11/459,602, 3 pages (Ording).

Examiner's Report dated Apr. 20, 2 010, in Australian Patent Application No. 2009204252, which corresponds to U.S. Appl. No. 12/242,851, 3 pages (Herz).

Final Office Action dated May 5, 2010, in U.S. Appl. No. 12/364,470, 18 pages (van Os).

Office Action dated Sep. 2, 2010, in U.S. Appl. No. 12/364,470, 29 pages (van Os).

Office Action dated Oct. 12, 2010, in U.S. Appl. No. 11/849,938, 25 pages (Chaudhri).

Office Action dated Oct. 15, 2010, in European Application No. 08 829 660.3, which corresponds to U.S. Appl. No. 11/849,938, 9 pages (Chaudhri).

Apple, "Welcome to Tiger," copyright © 2005 Apple Computer, Inc., 32 pages, http://manuals.info.apple.com/en/Welcome_to_Mac_OS_X_v10.4_Tiger.pdf.

delltech, "Working with Graphics," Windows XP: The Complete Reference, Chapter 18, Apr. 5, 2005, 4 pages.

Dodge et al., "Microsoft Office Excel 2003 Office Manual," Microsoft Press, Jul. 12, 2004, vol. 1, p. 66-68, Unable to Locate English Translation.

Widgipedia, "I Need a Bog and a Forum Please?" 2 pages, printed Oct. 19, 2006, http://www.widgipedia.com/widgets/details/adni18/hyalo-weather_27.html.

International Search Report and Written Opinion dated Jul. 8, 2008 for International Application No. PCT/US2007/077639, which corresponds to U.S. Appl. No. 11/850,010, 11 pages (Omernick).

Invitation to Pay Additional Fees dated Jun. 27, 2008, in International Application No. PCT/US2008/050430, which corresponds to U.S. Appl. No. 11/969,809, 7 pages (Platzer).

International Search Report and Written Opinion dated Sep. 1, 2008, in International Application No. PCT/US2008/050430, which corresponds to U.S. Appl. No. 11/969,809, 18 pages (Platzer).

International Search Report and Written Opinion dated Nov. 27, 2009, in International Application No. PCT/US2008/074341, which corresponds to U.S. Appl. No. 11/850,005, 25 pages (Chaudhri).

Office Action dated May 2, 2011, in U.S. Appl. No. 11/850,010, 12 pages (Omernick).

Final Office Action dated Oct. 17, 2011, in U.S. Appl. No. 11/850,010, 11 pages (Omernick).

Office Action dated May 16, 2012, in U.S. Appl. No. 11/850,010, 12 pages (Omenick).

Office Action dated Aug. 11, 2010, in U.S. Appl. No. 11/850,011, 28 pages (Forstall).

Final Office Action dated Dec. 1, 2010, in U.S. Appl. No. 11/850,011, 16 pages (Forstall).

Notice of Allowance dated Feb. 18, 2011, in U.S. Appl. No. 11/850,011, 11 pages (Forstall).

Office Action dated Jan. 18, 2012, in Chinese Patent Application No. 200780041309.3, which corresponds to U.S. Appl. No. 11/850,011, 15 pages (Forstall).

Office Action dated Mar. 4, 2011, in European Application No. 07 814 689.1, which corresponds to U.S. Appl. No. 11/850,011, 6 pages (Forstall).

Summons to attend oral proceedings dated Dec. 1, 2011, in European Patent Application No. 07814689.1, which corresponds to U.S. Appl. No. 11/850,011, 6 pages (Forstall).

Office Action dated Mar. 14, 2011, in U.S. Appl. No. 11/969,809, 25 pages (Platzer).

Final Office Action dated Jul. 14, 2011, in U.S. Appl. No. 11/969,809, 31 pages (Platzer).

Office Action dated Apr. 13, 2011, in U.S. Appl. No. 11/969,912, 20 pages (Lemay).

Final Office Action dated Oct. 31, 2011, in U.S. Appl. No. 11/969,912, 14 pages (Lemay).

Office Action dated Apr. 15, 2011, in U.S. Appl. No. 12/242,851, 33 pages (Herz).

Final Office Action dated Dec. 12, 2011, in U.S. Appl. No. 12/242,851, 17 pages (Herz).

Examiner's Report dated May 18, 2011, in Australian Patent Application No. 2009204252, which corresponds to U.S. Appl. No. 12/242,851, 2 pages (Herz).

Notification of Acceptance dated Oct. 17, 2011, in Australian Patent Application No. 2009204252, which corresponds to U.S. Appl. No. 12/242,851, 3 pages (Herz).

Office Action dated Oct. 21, 2011, in Australian Patent Application No. 2011101194, which corresponds to U.S. Appl. No. 12/242,851, 2 pages (Herz).

Certification of Australian Innovation Patent No. 2011101194 dated Mar. 2, 2012, which corresponds to U.S. Appl. No. 12/242,851, 4 pages (Herz).

Office Action dated Nov. 30, 2011, in Chinese Patent Application No. 200980000229.2, which corresponds to U.S. Appl. No. 12/242,851, 24 pages (Herz).

Office Action dated Nov. 26, 2010, in European Patent Application No. 09 700 333.9, which corresponds to U.S. Appl. No. 12/242,851, 5 pages (Herz).

Office Action dated Jun. 10, 2011, in European Patent Application No. 09 700 333.9, which corresponds to U.S. Appl. No. 12/242,851, 5 pages (Herz).

Office Action dated Apr. 18, 2011, in U.S. Appl. No. 12/217,029, 35 pages (Anzures).

Office Action dated Jan. 25, 2012, in U.S. Appl. No. 12/217,029, 24 pages (Anzures).

Office Action dated Nov. 13, 2009 in U.S. Appl. No. 12/364,470, 19 pages (van Os).
Office Action dated Mar. 4, 2011, in U.S. Appl. No. 12/364,470, 18 pages (van Os).
Final Office Action dated Oct. 19, 2011, in U.S. Appl. No. 12/364,470, 25 pages (van Os).
Final Office Action dated May 27, 2011, in U.S. Appl. No. 11/849,938, 23 pages (Chaudhri).
Office Action dated Dec. 14, 2011, in U.S. Appl. No. 11/849,938, 30 pages (Chaudhri).
Office Action dated Oct. 29, 2010, in Australian Patent Application No. 2008296445, which corresponds to U.S. Appl. No. 11/849,938, 2 pages (Chaudhri).
Notice of Acceptance dated Dec. 14, 2011, in Australian Patent Application No. 2008296445, which corresponds to U.S. Appl. No. 11/849,938, 3 pages (Chaudhri).
Office Action dated Aug. 24, 2011, in Chinese Patent Application No. 200880112570.2, which corresponds to U.S. Appl. No. 11/849,938, 6 pages (Chaudhri).
Office Action dated Feb. 13, 2012, in Japanese Patent Application No. 2010-524102, which corresponds to U.S. Appl. No. 11/849,938, 2 pages (Chaudhri).
Office Action dated Aug. 8, 2011, in Korean Patent Application No. 10-2010-7007258, which corresponds to U.S. Appl. No. 11/849,938, 2 pages (Chaudhri).
Cha, B., "HTC Touch (Sprint)," CNET Reviews, Nov. 6, 2007, http://web.archive.org/web/20071106065114/http://reviews.cnet.com/smartphones/htc-touch-sprint/4505-6452_7-3267123.html, 10 pages.
Gade, L., "HTC Touch (Sprint)—MobileTechReview," Smartphone Reviews by Mobile Tech Review, Nov. 2, 2007, http://www.mobiletechreview.com/phones/HTC-Touch.htm, 7 pages.
SnapFiles, "Dexpot," SnapFiles.com, Oct. 10, 2007, 3 pages.
Zhang et al., "An Ergonomics Study of Menu-Operation on Mobile Phone Interface," In Proceedings of the Workshop on Intelligent Information Technology Application, Dec. 2007, 5 pages.
Office Action dated Nov. 1, 2012, in Chinese Patent Appiication No. 200780041309.3, which corresponds to U.S. Appl. No. 11/850,011, 5 pages (Forstall).
Office Action dated Sep. 20, 2012, in U.S. Appl. No. 12/242,851, 21 pages (Herz).
Office Action dated Oct. 26, 2012, in Chinese Patent Application No. 200980000229.2, which corresponds to U.S. Appl. No. 12/242,851, 22 pages (Herz).
Summons to oral proceedings dated Sep. 21, 2012, in European Patent Application No. 09700333.9, which corresponds to U.S. Appl. No. 12/242,851, 4 pages (Herz).
Final Office Action dated Oct. 5, 2012, in U.S. Appl. No. 12/217,029, 32 pages (Anzures).
Office Action dated Oct. 26, 2012, in Japenese Patent Appiication No. 2010-524102, which corresponds to U.S. Appl. No. 11/849,938, 4 pages (Chaudhri).
Final Office Action dated Sep. 14, 2012, in U.S. Appl. No. 11/850,005, 22 pages (Chaudhri).
Decision to Grant dated Aug. 6, 2012, in Chinese Pantent Application No. 200880110709.X, which corresponds to U.S. Appl. No. 11/850,005, 2 pages (Chaudhri).

WEB-CLIP WIDGETS ON A PORTABLE MULTIFUNCTION DEVICE

RELATED APPLICATIONS

This application is a continuation application of U.S. application Ser. No. 11/850,011, filed Sep. 4, 2007, now U.S. Pat. No. 7,940,250, entitled "Web-Clip Widgets on a Portable Multifunction Device," which claims priority to U.S. Provisional Patent Application Nos. 60/937,993, "Portable Multifunction Device," filed Jun. 29, 2007; 60/946,712, "Web-Clip Widgets on a Portable Multifunction Device," filed Jun. 27, 2007; 60/883,805, "Web-Clip Widgets on a Portable Multifunction Device," filed Jan. 7, 2007; 60/879,469, "Portable Multifunction Device," filed Jan. 8, 2007; 60/879,253, "Portable Multifunction Device," filed Jan. 7, 2007; and 60/824,769, "Portable Multifunction Device," filed Sep. 6, 2006. All of these applications are incorporated by reference herein in their entirety.

This application is related to U.S. patent application Ser. No. 13/104,911 filed May 10, 2011, entitled "Web-Clip Widgets on a Portable Multifunction Device," which is incorporated by reference herein in its entirety.

This application also is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. Provisional Patent Application No. 60/658,777, "Multi-Functional Hand-Held Device," filed Mar. 4, 2005; and (10) U.S. patent application Ser. No. 11/367,749, "Multi-Functional Hand-Held Device," filed Mar. 3, 2006. All of these applications are incorporated by reference herein.

TECHNICAL FIELD

The disclosed embodiments relate generally to portable electronic devices, and more particularly, to creating widgets for displaying specified areas of web pages (i.e., creating web-clip widgets) on portable multifunction devices.

BACKGROUND

As portable electronic devices become more compact, and the number of functions performed by a given device increases, it has become a significant challenge to design a user interface that allows users to easily interact with a multifunction device. This challenge is particularly significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

As a result of the small size of display screens on portable electronic devices, frequently only a portion of a web page of interest to a user can be displayed on the screen at a given time. Furthermore, the scale of display may be too small for comfortable or practical viewing. Users thus will frequently need to scroll and to scale a web page to view a portion of interest each time that they access the web page. However, the limitations of conventional user interfaces can cause this scrolling and scaling to be awkward to perform.

Accordingly, there is a need for portable multifunction devices with more transparent and intuitive user interfaces for creating widgets for displaying specified areas of web pages (i.e., for creating web-clip widgets) that are easy to use, configure, and/or adapt.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer readable storage medium or other computer program product configured for execution by one or more processors.

In an aspect of the invention, a computer-implemented method for use at a portable multifunction device with a touch screen display includes displaying a web page or portion thereof on the touch screen display. An activation of a web-clip widget creation icon is detected. In response to detecting the activation, a web-clip widget is created from the web page or portion thereof.

In another aspect, a computer-implemented method for use at a portable multifunction device with a touch screen display includes: detecting an activation of a web-clip widget creation icon; selecting an area in a web page or portion thereof displayed on the touch screen display; detecting a finishing gesture; and in response to detecting the finishing gesture, creating a web-clip widget from the selected area.

In another aspect, a computer-implemented method for use at a portable multifunction device with a touch screen display includes: displaying an icon corresponding to a plurality of widgets, including two or more web-clip widgets; detecting an activation of the icon; in response to detecting the activation, displaying a first portion of the two or more web-clip widgets on the touch screen display; detecting a gesture on the touch screen display; and in response to detecting the gesture, displaying a second portion of the two or more web-clip widgets on the touch screen display.

In another aspect, a computer-implemented method for use at a portable multifunction device with a touch screen display includes: displaying an icon corresponding to a plurality of widgets, including two or more web-clip widgets; detecting an activation of the icon; in response to detecting the activation of the icon, displaying a plurality of icons corresponding to respective widgets in the plurality of widgets; detecting an activation of a respective icon in the plurality of icons, corresponding to a respective web-clip widget; in response to detecting the activation of the respective icon, displaying the respective web-clip widget; detecting a gesture on the touch screen display; and, in response to detecting the gesture, ceasing display of the respective web-clip widget and displaying another web-clip widget.

In another aspect, a graphical user interface on a portable multifunction device with a touch screen display includes a web-clip widget creation icon and a web page or portion thereof. In response to detecting activation of the web-clip widget creation icon, a web-clip widget is created from the web page or portion thereof.

In another aspect, a graphical user interface on a portable multifunction device with a touch screen display includes a web-clip widget creation icon and a web page or portion thereof. In response to detecting activation of the web-clip widget creation icon, detecting selection of an area in a web page or portion thereof displayed on the touch screen display, and detecting a finishing gesture, a web-clip widget is created from the selected area.

In another aspect, a graphical user interface on a portable multifunction device with a touch screen display includes an icon corresponding to a plurality of widgets, including two or more web-clip widgets. In response to detecting an activation of the icon, a first portion of the two or more web-clip widgets is displayed on the touch screen display. In response to detecting a gesture on the touch screen display, a second portion of the two or more web-clip widgets is displayed on the touch screen display.

In another aspect, a graphical user interface on a portable multifunction device with a touch screen display includes an icon corresponding to a plurality of widgets, including two or more web-clip widgets, and a plurality of icons corresponding to respective widgets in the plurality of widgets. In response to detecting an activation of the icon corresponding to the plurality of widgets, the plurality of icons is displayed. In response to detecting an activation of a respective icon in the plurality of icons, the respective web-clip widget is displayed. In response to detecting a gesture on the touch screen display; display of the respective web-clip widget is ceased and another web-clip widget is displayed.

In another aspect, a portable multifunction device includes a touch screen display, one or more processors, memory, and one or more programs. The one or more programs are stored in the memory and configured to be executed by the one or more processors. The one or more programs include instructions for displaying a web page or portion thereof on the touch screen display and instructions for detecting an activation of a web-clip widget creation icon. The one or more programs also include instructions for creating, in response to detecting the activation, a web-clip widget from the web page or portion thereof.

In another aspect, a portable multifunction device includes a touch screen display, one or more processors, memory, and one or more programs. The one or more programs are stored in the memory and configured to be executed by the one or more processors. The one or more programs include: instructions for detecting an activation of a web-clip widget creation icon; instructions for selecting an area in a web page or portion thereof displayed on the touch screen display; instructions for detecting a finishing gesture; and instructions for creating a web-clip widget from the selected area, in response to detecting the finishing gesture.

In another aspect, a portable multifunction device includes a touch screen display, one or more processors, memory, and one or more programs. The one or more programs are stored in the memory and configured to be executed by the one or more processors. The one or more programs include: instructions for displaying an icon corresponding to a plurality of widgets, including two or more web-clip widgets; instructions for detecting an activation of the icon; instructions for displaying a first portion of the two or more web-clip widgets on the touch screen display, in response to detecting the activation; instructions for detecting a gesture on the touch screen display; and instructions for displaying a second portion of the two or more web-clip widgets on the touch screen display, in response to detecting the gesture.

In another aspect, a portable multifunction device includes a touch screen display, one or more processors, memory, and one or more programs. The one or more programs are stored in the memory and configured to be executed by the one or more processors. The one or more programs include: instructions for displaying an icon corresponding to a plurality of widgets, including two or more web-clip widgets; instructions for detecting an activation of the icon; instructions for displaying a plurality of icons corresponding to respective widgets in the plurality of widgets, in response to detecting the activation of the icon; instructions for detecting an activation of a respective icon in the plurality of icons, corresponding to a respective web-clip widget; instructions for displaying the respective web-clip widget, in response to detecting the activation of the respective icon; instructions for detecting a gesture on the touch screen display; and instructions for ceasing display of the respective web-clip widget and displaying another web-clip widget, in response to detecting the gesture.

In another aspect, a computer-program product includes a computer readable storage medium and a computer program mechanism (e.g., one or more computer programs) embedded therein. The computer program mechanism comprises instructions, which when executed by a portable multifunction device with a touch screen display, cause the device to display a web page or portion thereof on the touch screen display; to detect an activation of a web-clip widget creation icon; and to create, in response to detecting the activation, a web-clip widget from the web page or portion thereof.

In another aspect, a computer-program product includes a computer readable storage medium and a computer program mechanism (e.g., one or more computer programs) embedded therein. The computer program mechanism includes instructions, which when executed by a portable multifunction device with a touch screen display, cause the device to: detect an activation of a web-clip widget creation icon; select an area in a web page or portion thereof displayed on the touch screen display; detect a finishing gesture; and create a web-clip widget from the selected area, in response to detecting the finishing gesture.

In another aspect, a computer-program product includes a computer readable storage medium and a computer program mechanism (e.g., one or more computer programs) embedded therein. The computer program mechanism includes instructions, which when executed by a portable multifunction device with a touch screen display, cause the device to: display an icon corresponding to a plurality of widgets, including two or more web-clip widgets; detect an activation of the icon; display a first portion of the two or more web-clip widgets on the touch screen display, in response to detecting the activation; detect a gesture on the touch screen display; and, in response to detecting the gesture, display a second portion of the two or more web-clip widgets on the touch screen display.

In another aspect, a computer-program product includes a computer readable storage medium and a computer program mechanism (e.g., one or more computer programs) embedded therein. The computer program mechanism includes instructions, which when executed by a portable multifunction device with a touch screen display, cause the device to: display an icon corresponding to a plurality of widgets, including two or more web-clip widgets; detect an activation of the icon; display a plurality of icons corresponding to respective widgets in the plurality of widgets, in response to detecting the activation of the icon; detect an activation of a respective icon in the plurality of icons, corresponding to a respective web-clip widget; display, in response to detecting the activation of the respective icon, the respective web-clip widget; detect a gesture on the touch screen display; and, in response to detecting the gesture, cease display of the respective web-clip widget and display another web-clip widget.

In another aspect, a portable multifunction device with a touch screen display includes: means for displaying a web page or portion thereof on the touch screen display; means for detecting an activation of a web-clip widget creation icon; and means for creating, in response to detecting the activation, a web-clip widget from the web page or portion thereof.

In another aspect, a portable multifunction device with a touch screen display includes: means for detecting an activation of a web-clip widget creation icon; means for selecting an area in a web page or portion thereof displayed on the touch screen display; means for detecting a finishing gesture; and means for creating a web-clip widget from the selected area, in response to detecting the finishing gesture.

In another aspect, a portable multifunction device with a touch screen display includes: means for displaying an icon corresponding to a plurality of widgets, including two or more web-clip widgets; means for detecting an activation of the icon; means for displaying a first portion of the two or more web-clip widgets on the touch screen display, in response to detecting the activation; means for detecting a gesture on the touch screen display; and means for displaying a second portion of the two or more web-clip widgets on the touch screen display, in response to detecting the gesture.

In another aspect, a portable multifunction device with a touch screen display includes: means for displaying an icon corresponding to a plurality of widgets, including two or more web-clip widgets; means for detecting an activation of the icon; means for displaying a plurality of icons corresponding to respective widgets in the plurality of widgets, in response to detecting the activation of the icon; means for detecting an activation of a respective icon in the plurality of icons, corresponding to a respective web-clip widget; means for displaying, in response to detecting the activation of the respective icon, the respective web-clip widget; means for detecting a gesture on the touch screen display; and means for ceasing display of the respective web-clip widget and displaying another web-clip widget, in response to detecting the gesture.

Activation of a web-clip widget created in accordance with the disclosed embodiments displays a previously specified area in a web page at a specified display size or scale factor. The user thus is spared from having to enlarge and center the area of the web page that is of interest each time the user visits the web page.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
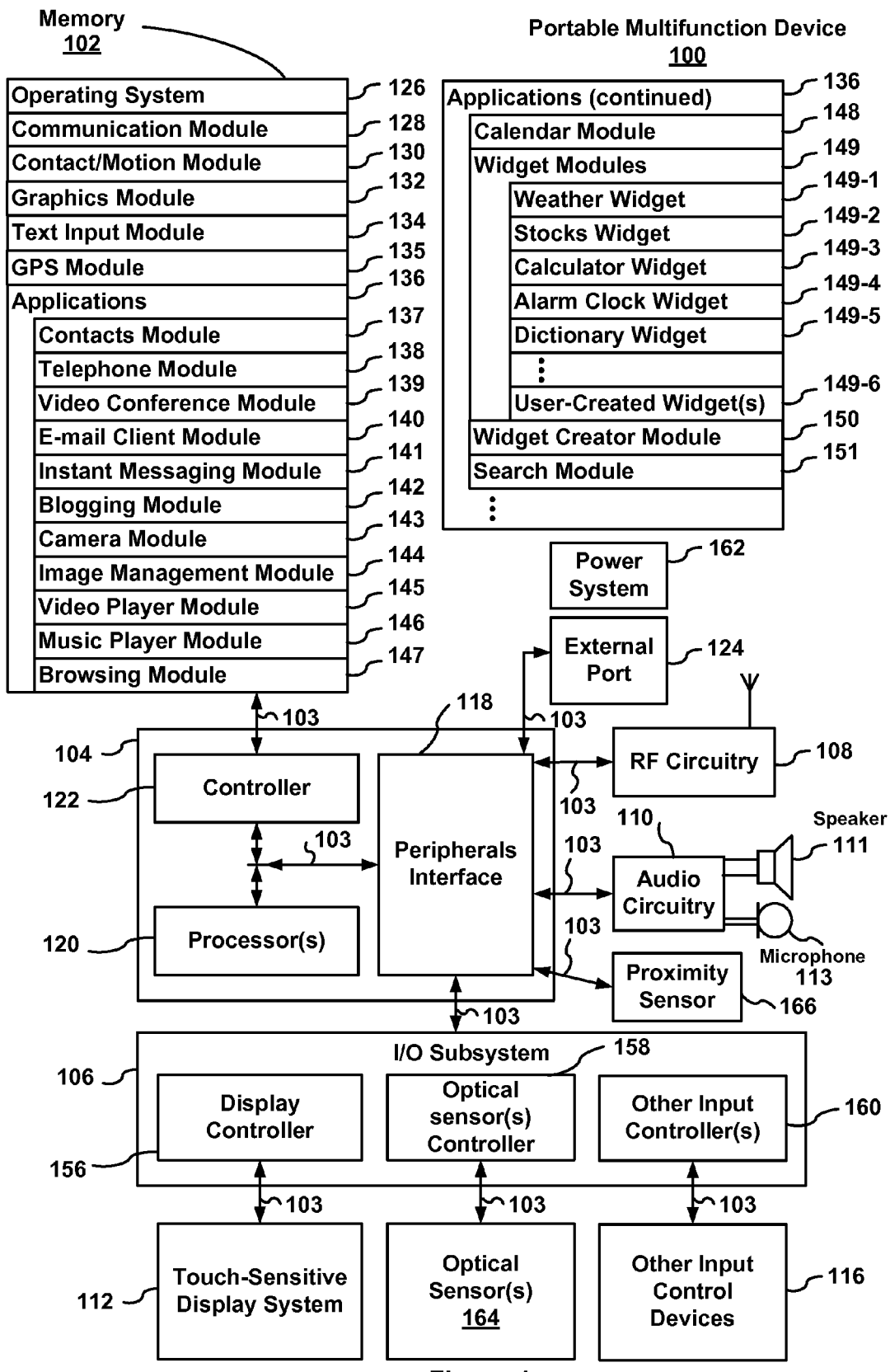
FIG. 1 is a block diagram illustrating a portable multifunction device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

The device supports a variety of applications, such as one or more of the following: a telephone application, a video conferencing application, an e-mail application, an instant messaging application, a blogging application, a photo management application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. Nos. 11/459,606, "Keyboards For Portable Electronic Devices," filed Jul. 24, 2006, and 11/459,615, "Touch Screen Keyboards For Portable Electronic Devices," filed Jul. 24, 2006, the contents of which are hereby incorporated by reference. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards embodiments of the device. FIG. 1 is a block diagram illustrating a portable multifunction device 100 with a touch-sensitive display 112 in accordance with some embodiments. The touch-sensitive display 112 is sometimes called a "touch screen" for convenience. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/ output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/ control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549 (Unlocking a Device by Performing Gestures on an Unlock Image, filed Dec. 23, 2005), which is hereby incorporated by reference. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. A touch-sensitive display in some embodiments of the touch screen 112 may be analogous to the multi-touch sensitive tablets described in the following U.S. Pat. No. 6,323,846 (Westerman et al.), U.S. Pat. No. 6,570, 557 (Westerman et al.), and/or U.S. Pat. No. 6,677,932 (Westerman), and/or U.S. Patent Publication 2002/0015024A1, each of which is hereby incorporated by reference. However, a touch screen 112 displays visual output from the portable device 100, whereas touch sensitive tablets do not provide visual output. The touch screen 112 may have a resolution in excess of 100 dpi. In an exemplary embodiment, the touch screen in the display system has a resolution of approximately 168 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

A touch-sensitive display in some embodiments of the touch screen 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIG. 1 shows a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. Nos. 11/241,839, "Proximity Detector in Handheld Device," filed Sep. 30, 2005, and 11/240,788, "Proximity Detector in Handheld Device," filed Sep. 30, 2005, which are hereby incorporated by reference. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. An animation in this context is a display of a sequence of images that gives the appearance of movement, and informs the user of an action that has been performed (such as expanding a user-selected web-page portion to fill a browser window). In this context, a respective animation that executed an action, or confirms or an action by the user of the device typically takes a predefined, finite amount of time, typically between 0.2 and 1.0 seconds, and generally less than two seconds.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:

a contacts module 137 (sometimes called an address book or contact list);
a telephone module 138;
a video conferencing module 139;
an e-mail client module 140;
an instant messaging (IM) module 141;
a blogging module 142;
a camera module 143 for still and/or video images;
an image management module 144;
a video player module 145;
a music player module 146;
a browser module 147;
a calendar module 148;
widget modules 149, which may include weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6; and/or
search module 151.

Examples of other applications 136 that may be stored in memory 102 include memo pad and other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the video-conferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol), to receive instant messages and to view received instant messages. In some embodiments, transmitted and/or received instant messages may include graphics, photos, audio files, video files and/or other attachments as are supported in a MMS and/or an Enhanced Messaging Service (EMS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages. Embodiments of user interfaces and associated processes using browser module 147 are described further below.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language)

file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget). Embodiments of user interfaces and associated processes using widget creator module 150 are described further below.

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
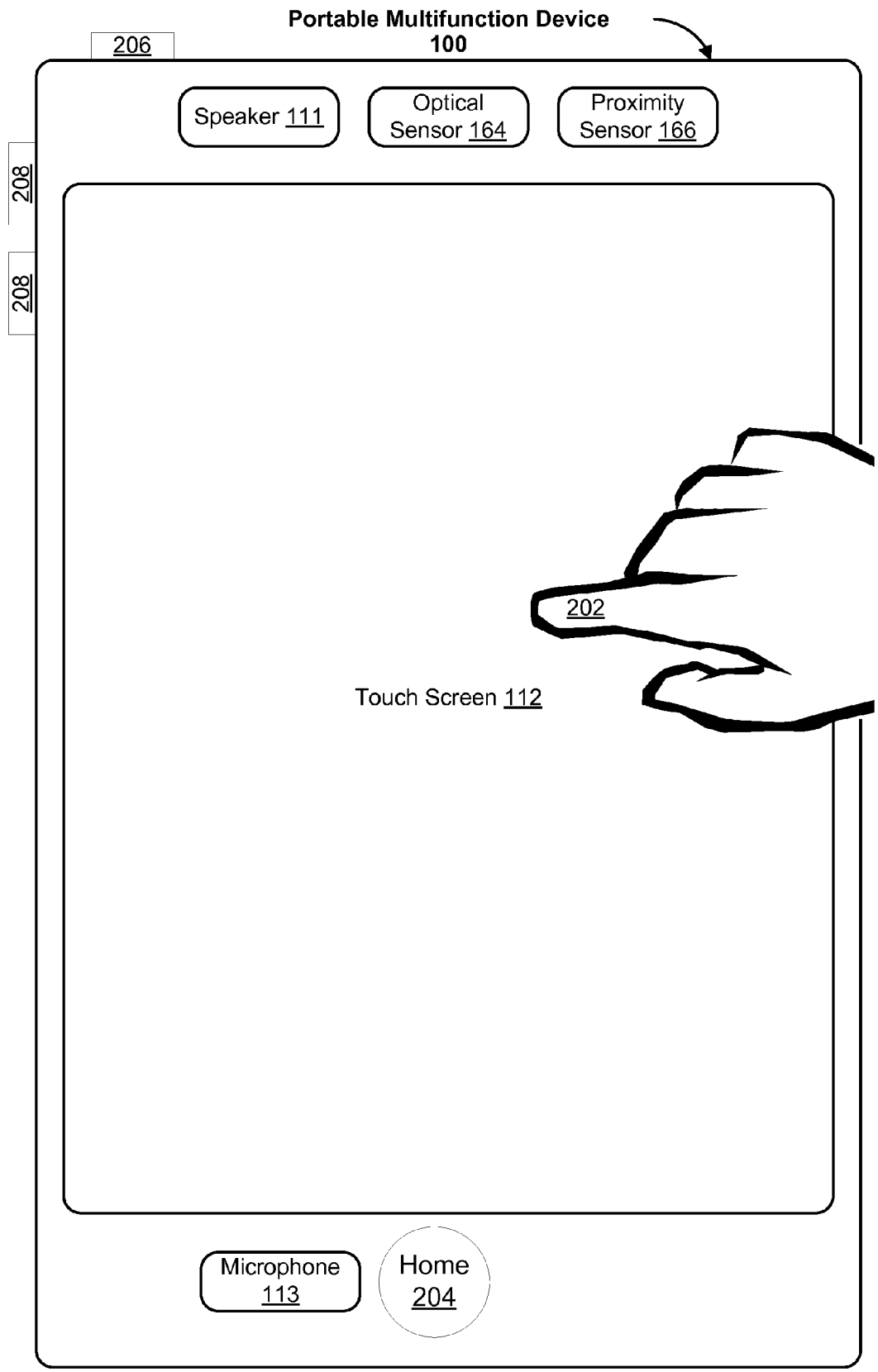
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, and volume adjustment button(s) 208. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
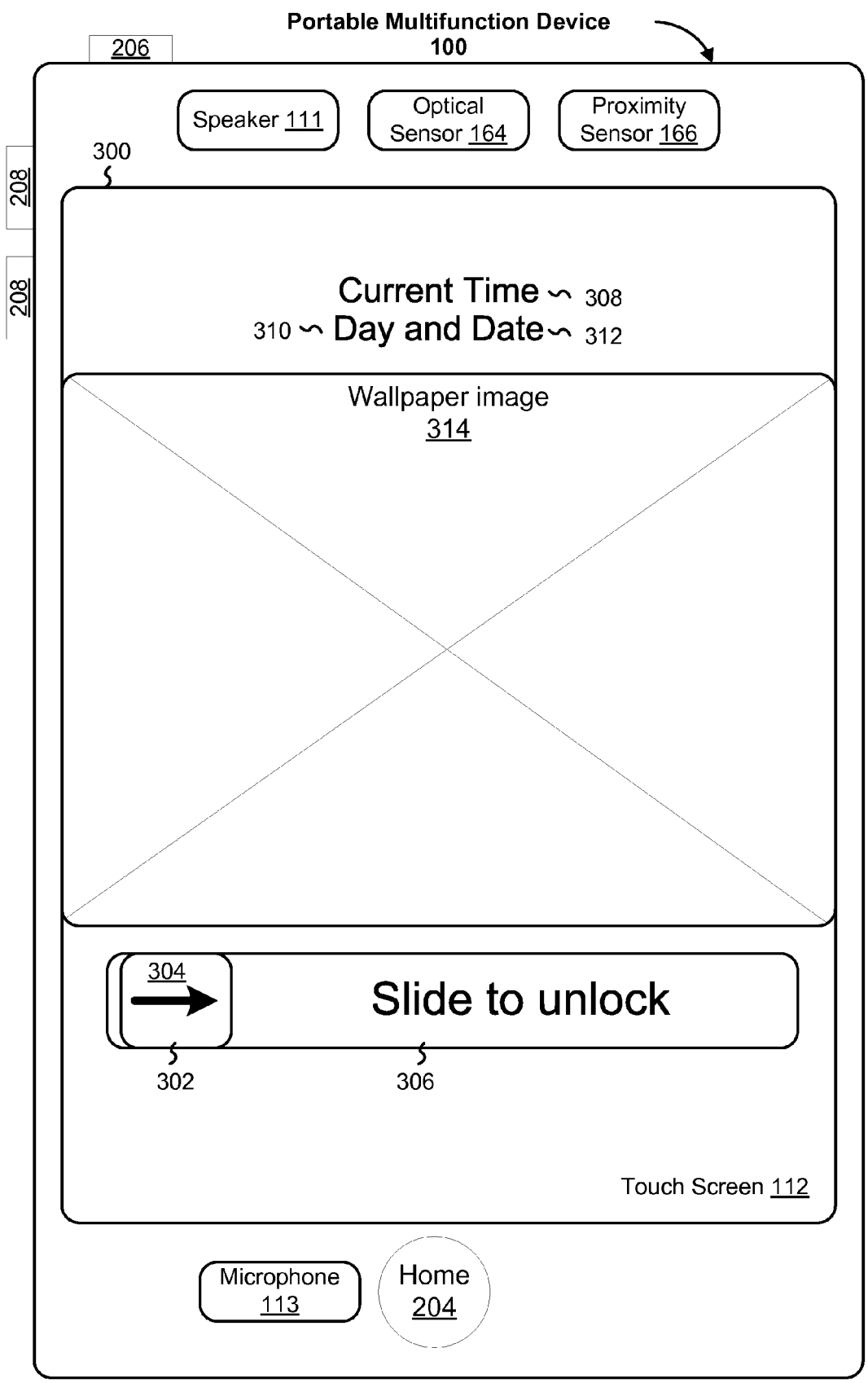
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:
  Unlock image 302 that is moved with a finger gesture to unlock the device;
  Arrow 304 that provides a visual cue to the unlock gesture;
  Channel 306 that provides additional cues to the unlock gesture;
  Time 308;
  Day 310;
  Date 312; and
  Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking a Device by Performing Gestures on an Unlock Image," filed Dec. 23, 2005, which is hereby incorporated by reference.

Figure 4A:
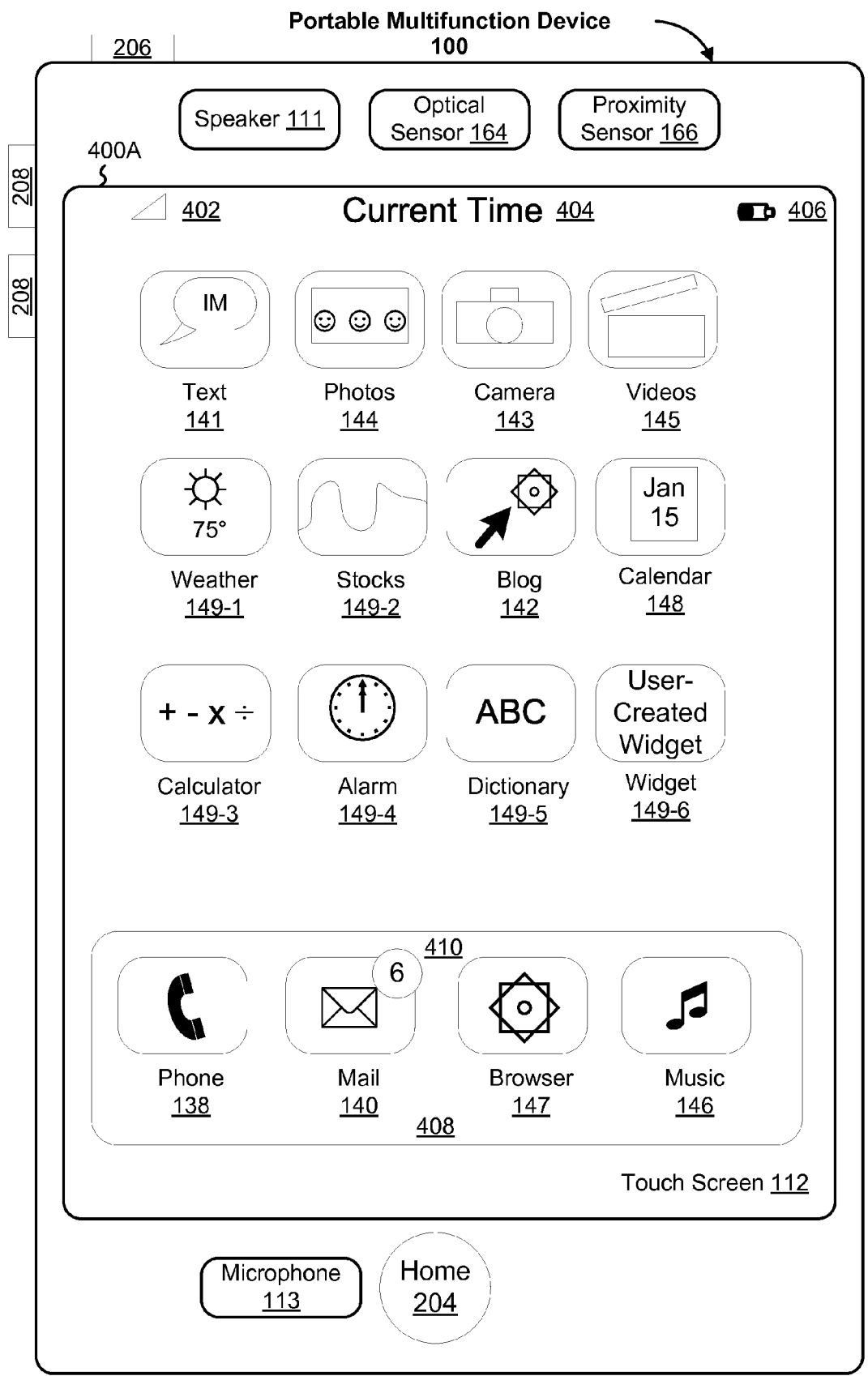
FIGS. 4A-4B illustrate exemplary user interfaces having menus of applications and/or widgets on a portable multifunction device in accordance with some embodiments.

FIG. 4A illustrates an exemplary user interface for a menu of applications on a portable multifunction device in accordance with some embodiments. In some embodiments, user interface 400A includes the following elements, or a subset or superset thereof:
  Signal strength indicator 402 for wireless communication;
  Time 404;
  Battery status indicator 406;
  Tray 408 with icons for frequently used applications, such as:
    Phone 138;
    E-mail client 140, which may include an indicator 410 of the number of unread e-mails;
    Browser 147; and
    Music player 146; and
  Icons for other applications, such as:
    IM 141;
    Image management 144;
    Camera 143;
    Video player 145;
    Weather 149-1;

Stocks 149-2;
Blog 142;
Calendar 148;
Calculator 149-3;
Alarm clock 149-4;
Dictionary 149-5; and
User-created widget 149-6.

In some embodiments, UI 400A displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400A provides integrated access to both widget-based applications and non-widget-based applications. In some embodiments, all of the widgets, whether user-created or not, are displayed in UI 400A. In other embodiments, activating the icon for user-created widget 149-6 may lead to another UI that displays the user-created widgets or icons corresponding to the user-created widgets. For example, UI 400B (FIG. 4B) displays a menu of six icons corresponding to six user-created widgets 149-6-1 through 149-6-6 in accordance with some embodiments. A user may activate a particular widget by gesturing on the corresponding icon. Alternatively, user-created widgets may be displayed in a list. UI 400C (FIG. 4C) illustrates a list of names of six user-created widgets 149-6-1 through 149-6-6 along with corresponding icons in accordance with some embodiments. A user may activate a particular widget by gesturing on the corresponding name or icon.

In some embodiments, a user may rearrange the icons in UI 400A, UI 400B, or UI 400C, e.g., using processes described in U.S. patent application Ser. No. 11/459,602, "Portable Electronic Device With Interface Reconfiguration Mode," filed Jul. 24, 2006, which is hereby incorporated by reference. For example, a user may move application icons in and out of tray 408 using finger gestures.

In some embodiments, UI 400A includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference.

FIGS. 5A-5I illustrate an exemplary user interface for a browser in accordance with some embodiments.

In some embodiments, user interface 3900A (FIG. 5A) includes the following elements, or a subset or superset thereof:
- 402, 404, and 406, as described above;
- Previous page icon 3902 that when activated (e.g., by a finger tap on the icon) initiates display of a previous web page (if any);
- Web page name 3904;
- Next page icon 3906 that when activated (e.g., by a finger tap on the icon) initiates display of a next web page (if any);
- URL (Uniform Resource Locator) entry box 3908 for inputting URLs of web pages;
- Refresh icon 3910 that when activated (e.g., by a finger tap on the icon) initiates a refresh of the web page;
- Web page 3912 or other structured document, which includes a plurality of blocks 3914 of text content and other graphics (e.g., images);
- Settings icon 3916 that when activated (e.g., by a finger tap on the icon) initiates display of a settings menu for the browser;
- Bookmarks icon 3918 that when activated (e.g., by a finger tap on the icon) initiates display of a bookmarks list or menu for the browser;
- Add bookmark icon 3920 that when activated (e.g., by a finger tap on the icon) initiates display of a UI for adding bookmarks (e.g., UI 3900F, FIG. 5F, which like other UIs and pages, can be displayed in either portrait or landscape view);
- New window icon 3922 that when activated (e.g., by a finger tap on the icon) initiates display of a UI for adding new windows to the browser (e.g., UI 3900G, FIG. 5G); and
- Widget creation icon 3924 that when activated (e.g., by a finger tap on the icon) initiates creation of a web-clip widget.

Figure 5A:
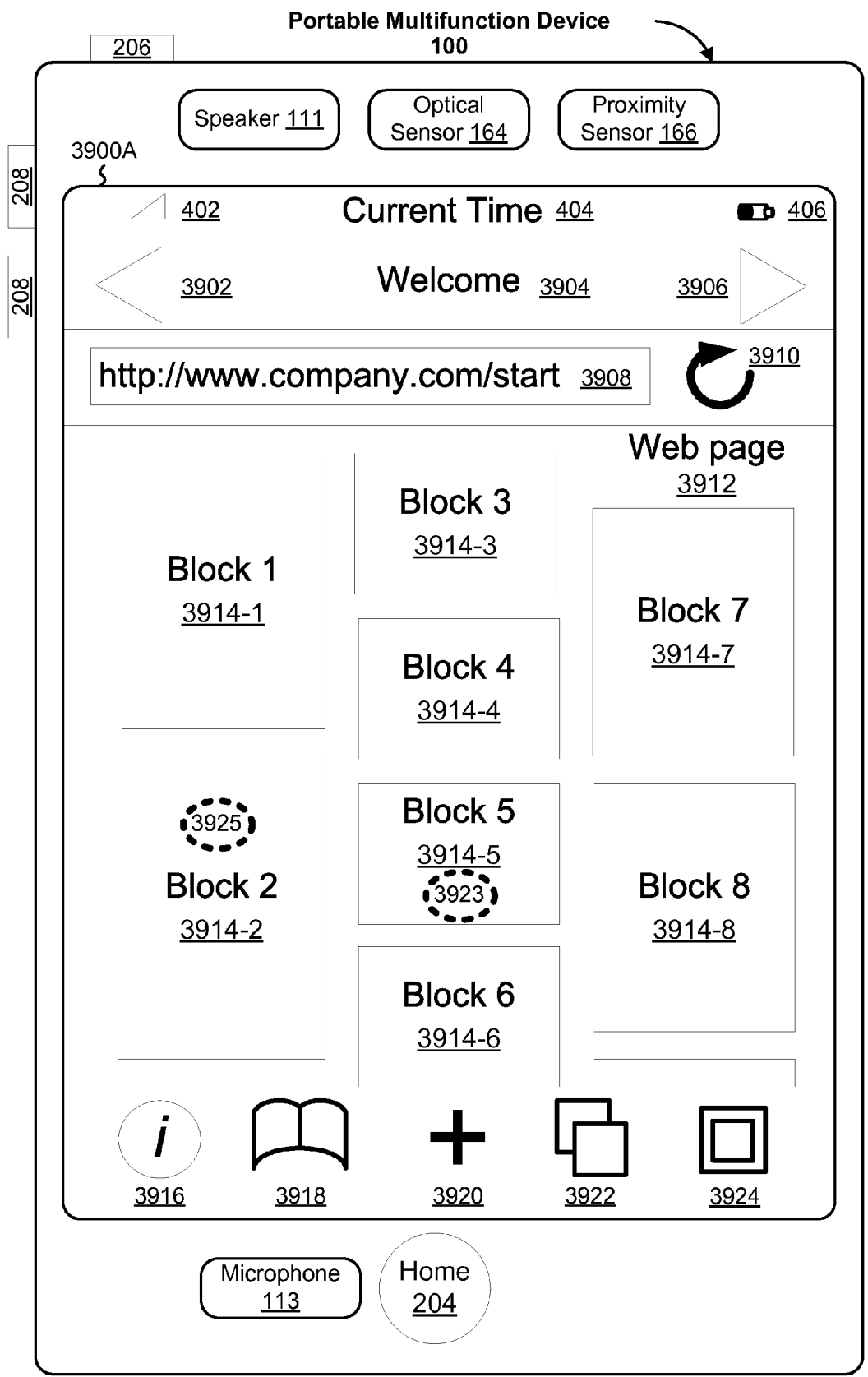
FIGS. 5A-5J illustrate an exemplary user interface for a browser in accordance with some embodiments.

In some embodiments, in response to a predefined gesture by the user on a block 3914 (e.g., a single tap gesture or a double tap gesture), the block is enlarged and centered (or substantially centered) in the web page display. For example, in response to a single tap gesture 3923 on block 3914-5, the user-selected block 3914-5 may be enlarged and centered in the display, as shown in UI 3900C (FIG. 5C). In some embodiments, the width of the user-selected block is scaled to fill the touch screen display. In some embodiments, the width of the user-selected block is scaled to fill the touch screen display with a predefined amount of padding along the sides of the display. In some embodiments, a zooming animation of the user-selected block is displayed during enlargement of the block. Similarly, in response to a single tap gesture 3925 on block 3914-2, block 3914-2 may be enlarged with a zooming animation and two-dimensionally scrolled to the center of the display (not shown).

In some embodiments, the device analyzes the render tree of the web page 3912 to determine the blocks 3914 in the web page. In some embodiments, a block 3914 corresponds to a render node that is: replaced; a block; an inline block; or an inline table.

In some embodiments, in response to the same predefined gesture by the user on a block 3914 (e.g., a single tap gesture or a double tap gesture) that is already enlarged and centered, the enlargement and/or centering is substantially or completely reversed. For example, in response to a single tap gesture 3929 on block 3914-5 (FIG. 5C), the web page image may zoom out and return to UI 3900A (FIG. 5A).

In some embodiments, in response to a predefined gesture (e.g., a single tap gesture or a double tap gesture) by the user on a block 3914 that is already enlarged but not centered, the block is centered (or substantially centered) in the web page display. For example, in response to a single tap gesture 3927 on block 3914-4 (FIG. 5C), block 3914-4 may be centered (or substantially centered) in the web page display. Similarly, in response to a single tap gesture 3935 on block 3914-6, block 3914-6 may be centered (or substantially centered) in the web page display. Thus, for a web page display that is already enlarged, in response to a predefined gesture, the device may display in an intuitive manner a series of blocks that the user wants to view. This same gesture may initiate different actions in different contexts (e.g., (1) zooming and/or enlarging in combination with scrolling when the web page is reduced in size, UI 3900A and (2) reversing the enlargement and/or centering if the block is already centered and enlarged).

In some embodiments, in response to a multi-touch (3931 and 3933) de-pinching gesture by the user (FIG. 5C), the web page may be enlarged. Conversely, in response to a multi-touch pinching gesture by the user, the web page may be reduced.

In some embodiments, in response to a substantially vertical upward (or downward) swipe gesture by the user, the web page (or, more generally, other electronic documents) may scroll one-dimensionally upward (or downward) in the vertical direction. For example, in response to an upward swipe gesture 3937 by the user that is within a predetermined angle (e.g., 27°) of being perfectly vertical, the web page may scroll one-dimensionally upward in the vertical direction.

Conversely, in some embodiments, in response to a swipe gesture that is not within a predetermined angle (e.g., 27°) of being perfectly vertical, the web page may scroll two-dimensionally (i.e., with simultaneous movement in both the vertical and horizontal directions). For example, in response to an upward or diagonal swipe gesture 3939 by the user that is not within a predetermined angle (e.g., 27°) of being perfectly vertical, the web page may scroll two-dimensionally along the direction of the swipe 3939.

In some embodiments, in response to a multi-touch (3941 and 3943) rotation gesture by the user, the web page may be rotated exactly 90° (UI 3900D, FIG. 5D) for landscape viewing, even if the amount of rotation in the multi-touch (3941 and 3943) rotation gesture is substantially different from 90°. Similarly, in response to a multi-touch (3945 and 3947) rotation gesture by the user (UI 3900D, FIG. 5D), the web page may be rotated exactly 90° for portrait viewing, even if the amount of rotation in the multi-touch (3945 and 3947) rotation gesture is substantially different from 90°.

Thus, in response to imprecise gestures by the user, precise movements of graphics occur. The device behaves in the manner desired by the user despite inaccurate input by the user. Also, note that the gestures described for UI 3900C, which has a portrait view, are also applicable to UIs with a landscape view (e.g., UI 3900D, FIG. 5D) so that the user can choose whichever view (portrait or landscape) the user prefers for web browsing.

Figure 5B:
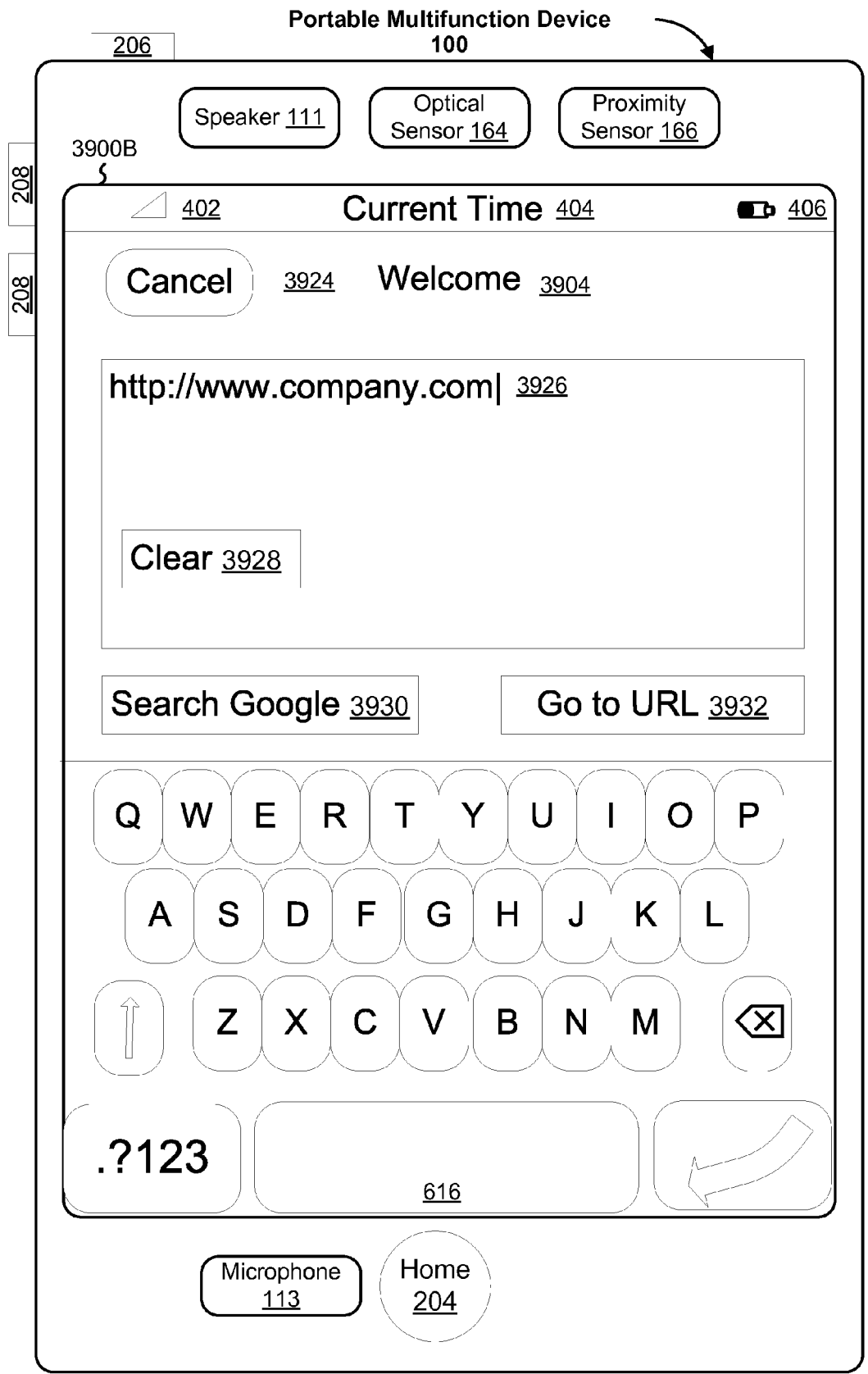
Figure 5C:
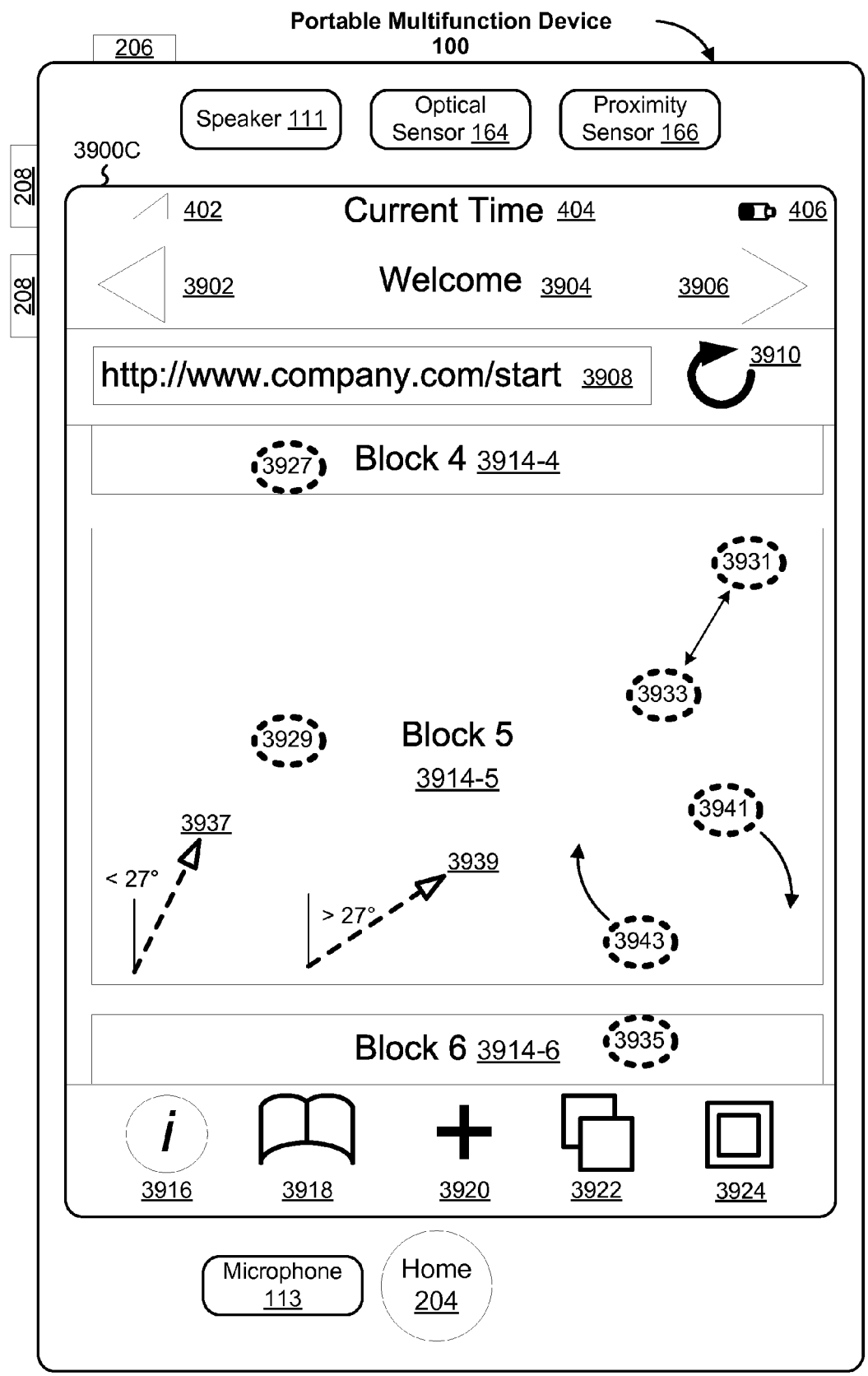
Figure 5D:
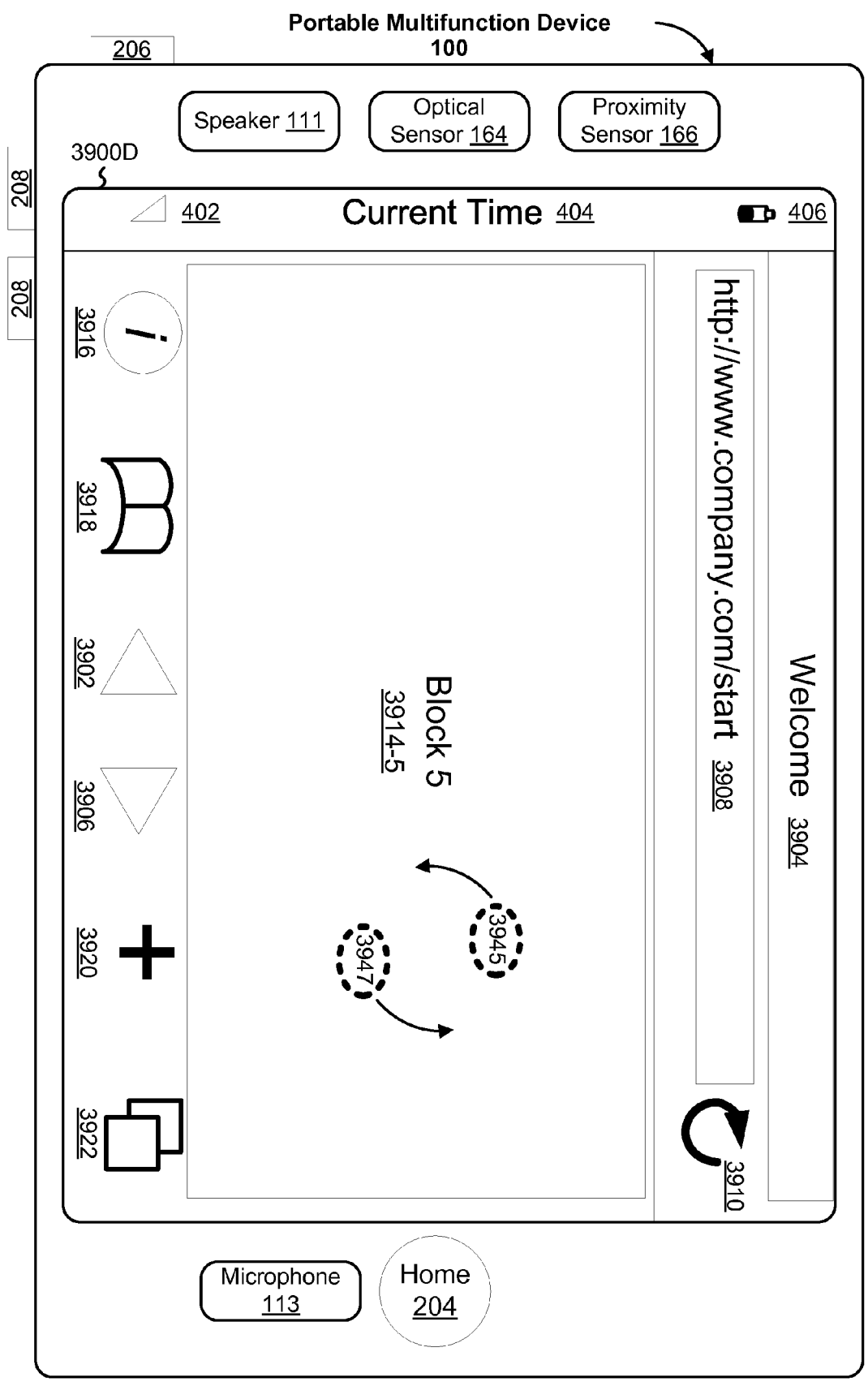
Figure 5E:
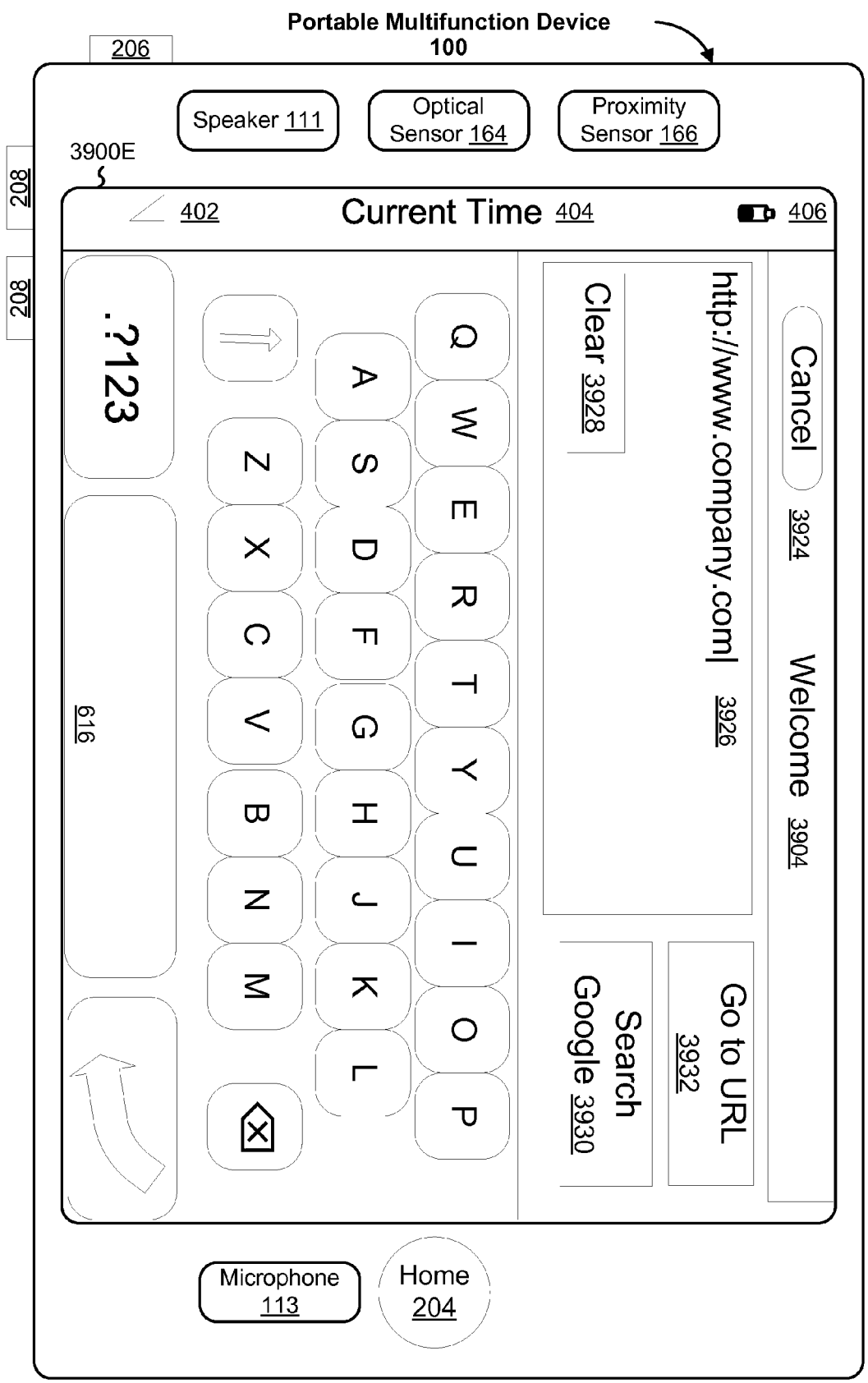
Figure 5F:
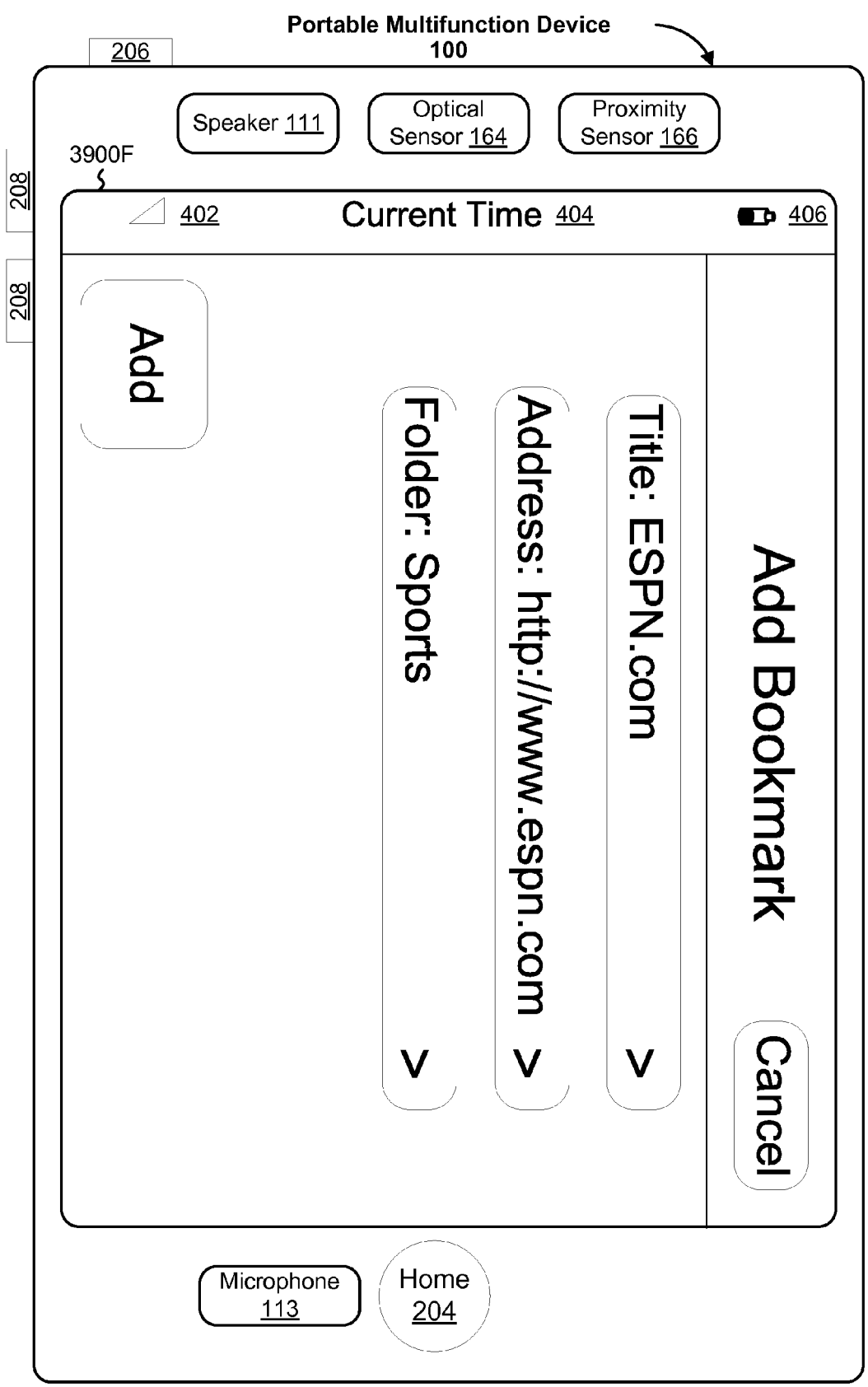
Figure 5G:
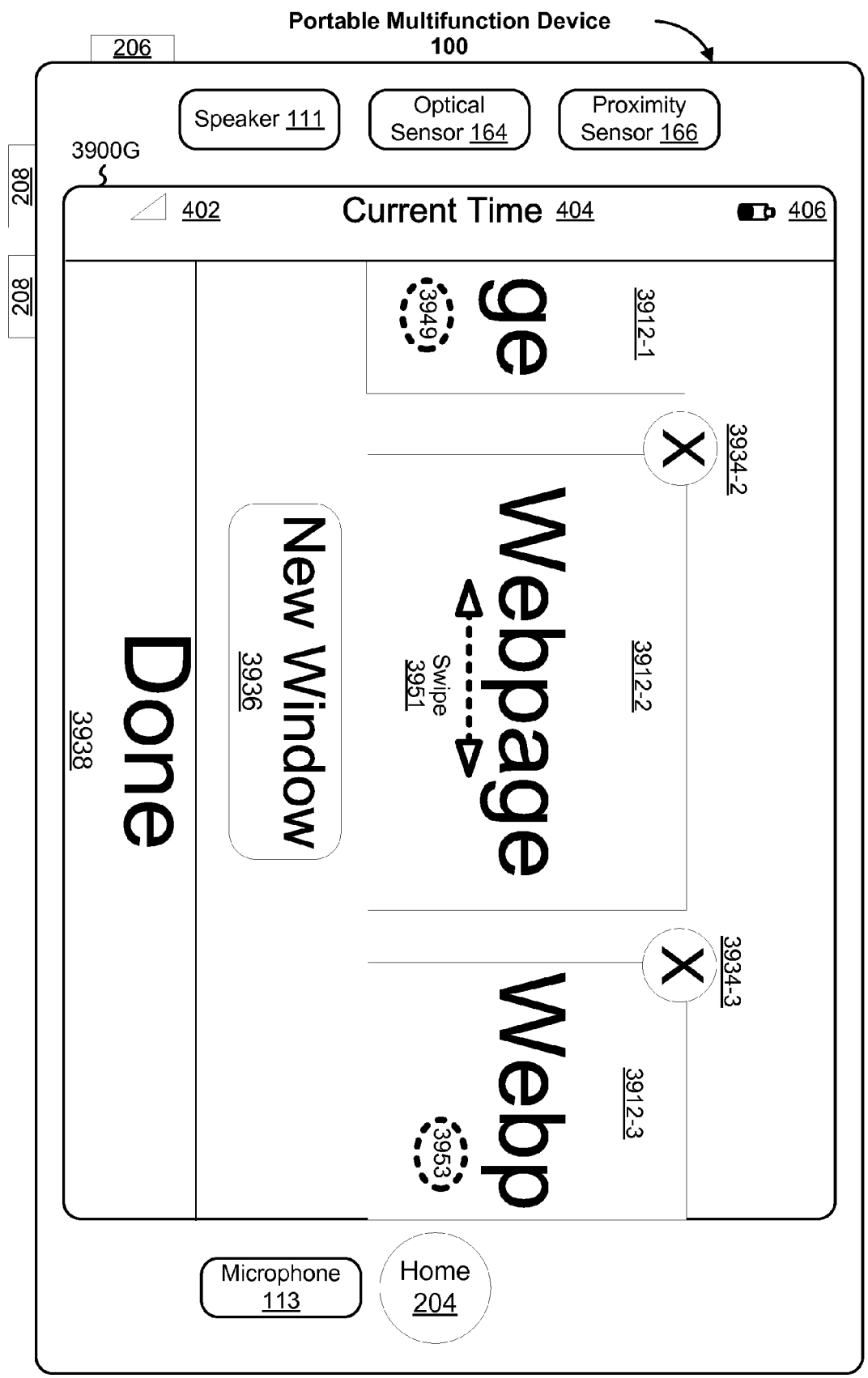
Figure 5H:
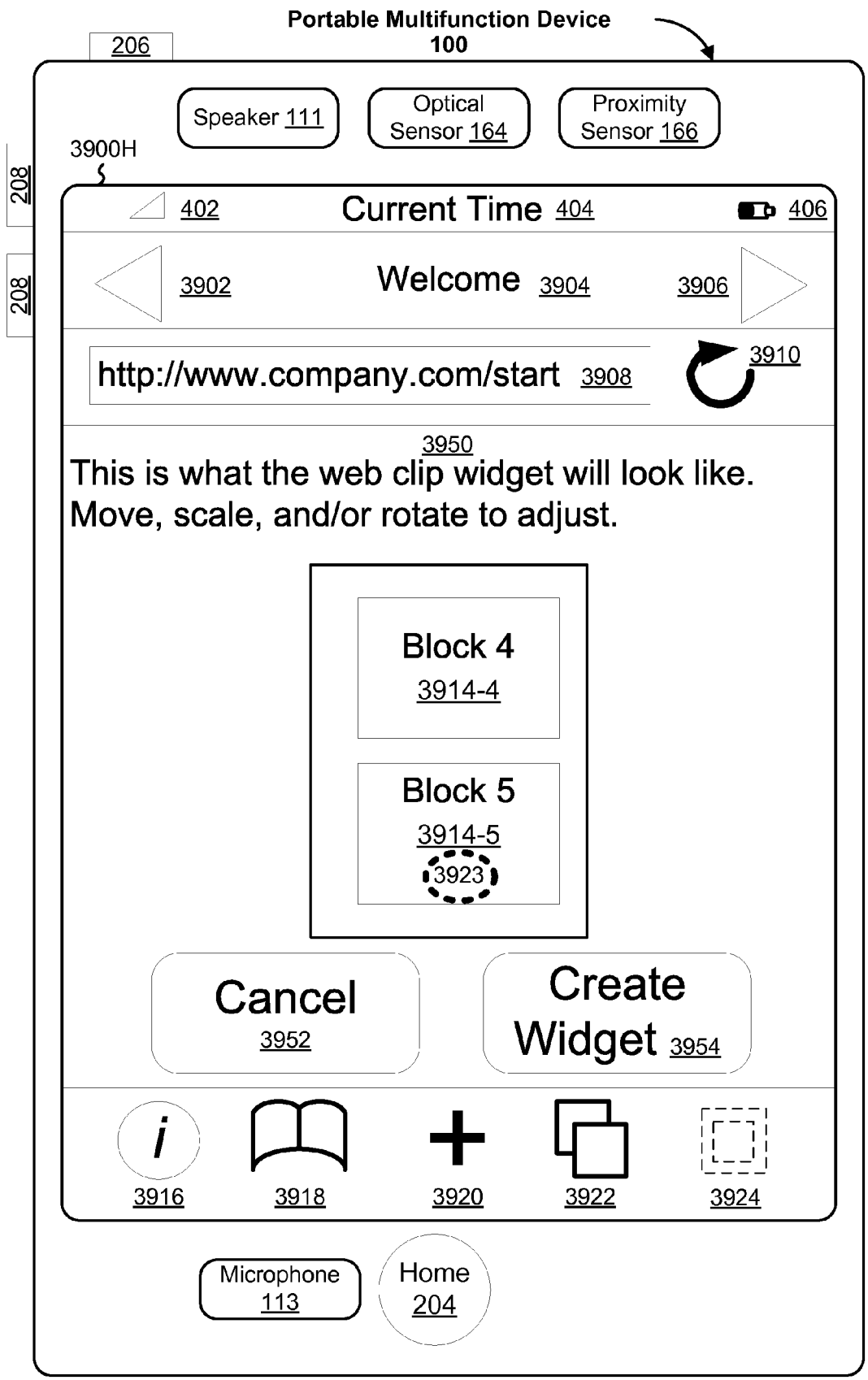

In some embodiments, in response to a tap or other predefined user gesture on URL entry box 3908 (UI 3900A, FIG. 5A), the touch screen displays an enlarged entry box 3926 and a keyboard 616 (e.g., UI 3900B, FIG. 5B in portrait viewing and UI 3900E, FIG. 5E in landscape viewing). In some embodiments, the touch screen also displays:

Contextual clear icon 3928 that when activated (e.g., by a finger tap on the icon) initiates deletion of all text in entry box 3926;

a search icon 3930 that when activated (e.g., by a finger tap on the icon) initiates an Internet search using the search terms input in box 3926; and Go to URL icon 3932 that when activated (e.g., by a finger tap on the icon) initiates acquisition of the web page at the URL in box 3926;

Thus, the same entry box 3926 may be used for inputting both search terms and URLs. In some embodiments, whether or not clear icon 3928 is displayed depends on the context.

UI 3900G (FIG. 5G) is a UI for adding new windows to an application, such as the browser 147. UI 3900G displays an application (e.g., the browser 147), which includes a displayed window (e.g., web page 3912-2) and at least one hidden window (e.g., web pages 3912-1 and 3912-3 and possibly other web pages that are completely hidden off-screen). UI 3900G also displays an icon for adding windows to the application (e.g., new window or new page icon 3936). In response to detecting activation of the icon 3936 for adding windows, the browser adds a window to the application (e.g., a new window for a new web page 3912).

In response to detecting a gesture on the touch screen display, a displayed window in the application is moved off the display and a hidden window is moved onto the display. For example, in response to detecting a tap gesture 3949 on the left side of the screen, the window with web page 3912-2 is moved partially or fully off-screen to the right, the window with web page 3912-3 is moved completely off-screen, partially hidden window with web page 3912-1 is moved to the center of the display, and another completely hidden window (not shown in FIG. 5G) with a web page may be moved partially onto the display. Alternatively, detection of a left-to-right swipe gesture 3951 may achieve the same effect.

Conversely, in response to detecting a tap gesture 3953 on the right side of the screen, the window with web page 3912-2 is moved partially or fully off-screen to the left, the window with web page 3912-1 is moved completely off-screen, partially hidden window with web page 3912-3 is moved to the center of the display, and another completely hidden window (not shown in FIG. 5G) with a web page may be moved partially onto the display. Alternatively, detection of a right-to-left swipe gesture 3951 may achieve the same effect.

In some embodiments, in response to a tap or other predefined gesture on a delete icon 3934 (e.g., 3934-2 or 3934-3), the corresponding window 3912 is deleted. In some embodiments, in response to a tap or other predefined gesture on Done icon 3938, the window in the center of the display (e.g., 3912-2) is enlarged to fill the screen.

A user may create a web-clip widget in accordance with some embodiments. Activation of the user-created web-clip widget displays a previously specified area in a web page (having a specified URL) at a specified display size or scale factor. The displayed area, referred to as a web clip, may be displayed in a browser application (e.g., the browser 147) or other application for viewing the web clip. For example, activation of the web-clip widget may display a particular block that is of interest to the user within the web page; furthermore, the block may be enlarged. Activation of the web-clip widget thus prevents the user from having to enlarge and center the web page area that is of interest, such as the particular block of interest, each time the user visits the web page.

Web-clip widgets provide more functionality than mere bookmarks: activation of a bookmark only displays a specified web page, while activation of a web-clip widget displays a specified area of a web page at a specified scale factor in accordance with some embodiments. Similarly, a web-clip widget is distinguishable from a hyperlink. To view a web page or portion thereof specified by a hyperlink, the user must activate the browser application, navigate to a web page containing the hyperlink, activate the hyperlink, and then potentially scroll and/or scale the resulting web page. In contrast, to view an area of a web page specified by a web-clip widget, the user merely activates the widget.

A web-clip widget comprises an executable script. In some embodiments, the widget includes an HTML (Hypertext Markup Language) file, a CSS (Cascading Style Sheets) file, and a JavaScript file. In some embodiments, the widget includes an XML (Extensible Markup Language) file and a JavaScript file (e.g., Yahoo! Widgets).

Figure 4B:
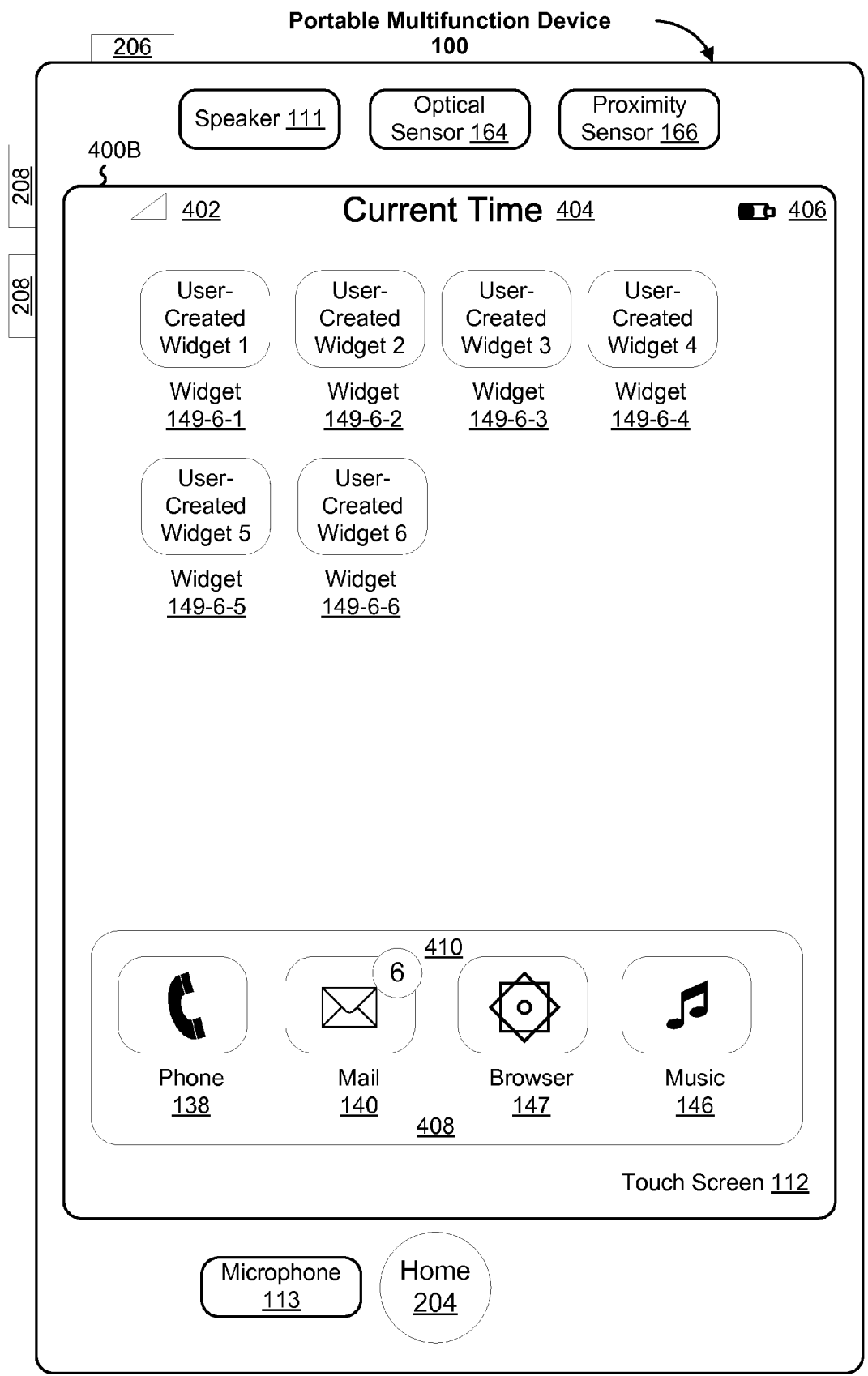
Figure 4C:
FIG. 4C illustrates an exemplary user interface having a list of user-created widgets on a portable multifunction device in accordance with some embodiments.
Figure 6A:
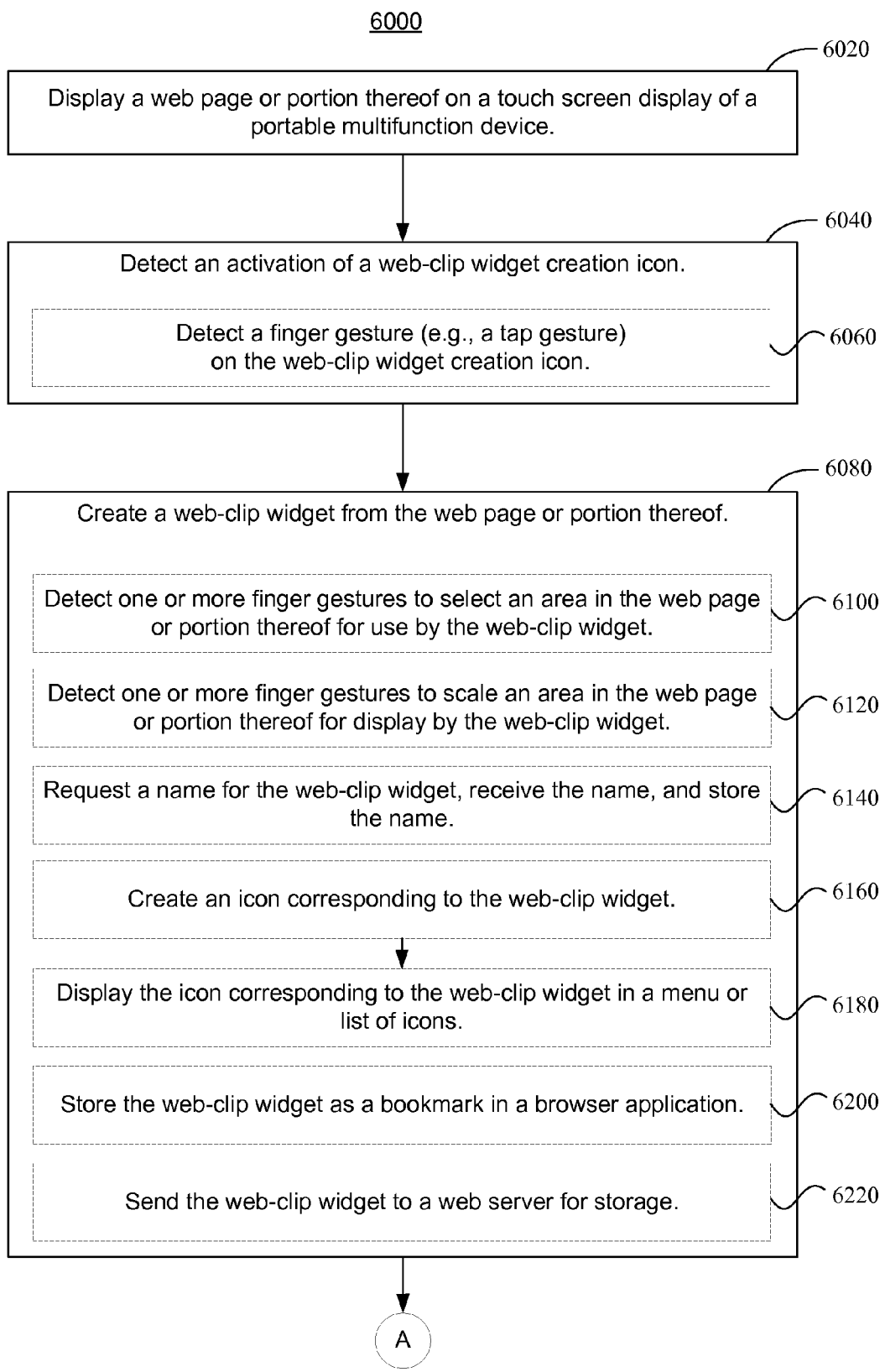
FIGS. 6A-6E are flow diagrams illustrating processes for creating a web-clip widget from a web page or portion thereof in accordance with some embodiments.

Referring to FIG. 5C, in some embodiments, once a user has centered and/or enlarged an area of a web page, the user may create a web-clip widget simply by activating the widget creation icon 3924. In some embodiments, the user activates the icon 3924 by performing a tap or other predefined gesture on the icon 3924. The icon 3924 is an example of a widget creation icon referenced in operation 6040 of process 6000 (FIG. 6A). As a result of activating the icon 3924, a web-clip widget corresponding to the centered and/or enlarged area of the web page will be created and will be assigned a name. For example, the newly created widget may be assigned the same name as the web page name 3904. An icon corresponding to the newly created widget may be created and displayed on a menu in a UI such as UI 400A or UI 400B (FIG. 4A or 4B). Alternatively, the icon and/or the name of the newly created widget may be listed on a UI such as UI 400C (FIG. 4C). Subsequent activation of the newly created widget will launch a browser application (e.g., the browser 147) that will display the centered and/or enlarged area of the web page.

For example, as described above, a user viewing web page 3912 (FIG. 5A) may enlarge and center block 3914-5 by performing a single tap gesture 3923 on block 3914-5. As a result, block 3914-5 appears enlarged and centered in the browser window, as shown in FIG. 5C. The user then may perform a single tap gesture on the widget creation icon 3924 to create a widget corresponding to block 3914-5, in accordance with some embodiments. In some embodiments, the newly created widget will be assigned the web page name 3904. A corresponding icon may be created and displayed on a menu such as in UI 400A or 400B or in a list such as in UI 400C, as described in operations 6160 and 6180 of process 6000 (FIG. 6A). Subsequent activation of the newly created widget will launch the browser 147, which will display block 3914-5, as shown in UI 3900C (FIG. 5C).

In some embodiments, instead of or in addition to performing a single tap gesture 3923 or 3925 (FIG. 5A) to center and enlarge a block, a user may define the area of a web page to be associated with a widget by performing one or more other gestures. Examples of gestures that may be used to define the area of the web page include a single tap gesture 3927 or 3935 (FIG. 5C) to center an adjacent enlarged block; a multi-touch depinching gesture (3931 and 3933) (FIG. 5C) to enlarge the web page; a multi-touch pinching gesture (not shown) to reduce the web page; swipe gestures such as a substantially vertical swipe 3937, an upward or diagonal swipe 3939 (FIG. 5C), and/or other swipe gestures (not shown) to scroll the web page; and/or a multi-touch rotation gesture (3941 and 3943) to select a portrait or landscape view (FIG. 5C).

In some embodiments, instead of first defining the area of the web page to be associated with the widget and then activating the widget creation icon 3924, a user may first activate the widget creation icon 3924 (FIG. 5A or 5C) and then define the area by performing gestures such as those described above. These gestures are detected by the touch screen display, in accordance with operations 6100 and 6120 of process 6000 (FIG. 6A) and with operations 6640, 6650, and 6660 of process 6600 (FIG. 6E). Once the area has been selected and/or scaled, the user may gesture on the touch screen to indicate that the area of the web page to be associated with the widget has been defined. For example, the user may gesture again on the widget creation icon 3924.

In some embodiments, in response to the user activating the widget creation icon 3924, the device displays a user interface (e.g., UI 3900H, FIG. 5H) that lets the user define the area of the web page to be associated with the widget. The user may define the area using gestures such as the gestures described above with reference to UIs 3900A, 3900C, and 3900D (FIGS. 5A, 5C, and 5D). In some embodiments, UI 3900H may include information 3950 to help guide the user. In some embodiments, the user may activate a cancel icon 3952 to abort the widget creation process and may activate a create widget icon 3954 to complete the widget creation process. In some embodiments, a rotation gesture such as multi-touch rotation gesture (3941 and 3943) rotates the entire UI 3900H, and not just the defined area, from portrait viewing to landscape viewing or vice versa.

In some embodiments, in response to the user activating the widget creation icon 3924, the device displays a user interface (e.g., UI 3900J, FIG. 5J) that lets the user define the area of a web page to be associated with a widget by toggling between frames. The frames are successively overlaid on the web page to frame or highlight successive blocks and other structural elements of the web page. For example, in UI 3900J a frame 3958 frames block 2 3914-2. The user may activate a toggle icon 3956 to toggle between successive blocks, in accordance with operation 6640 of process 6600 (FIG. 6E). Once a block of interest is framed, the user may activate a create widget icon 3954 to create a widget corresponding to the framed block. The user may activate a cancel icon 3952 to end the widget creation process.

In some embodiments, the web-clip widget is assigned the same name as the web page name 3904. In some other embodiments, however, the user is prompted to enter a name for the newly created web-clip widget, in accordance with operation 6140 of process 6000 (FIG. 6A). For example, once the area of the web page to be associated with the widget has been defined, UI 3900I (FIG. 5I) will appear and will prompt the user to enter the widget name in text entry box 3960 using the contextual keyboard 616. In some embodiments, the user can access other keyboards that display other symbols by activating the alternate keyboard selector icon 618. In some embodiments, the user can clear all text in the text entry box 3960 by activating the contextual clear icon 3928. In some embodiments, after the user has entered the widget name, a corresponding icon is created and displayed in a menu or list.

UI 3900K (FIG. 5K) is a UI for displaying a portion of two or more web-clip widgets, in accordance with some embodiments. The displayed portion may include a first web-clip widget (e.g., 149-6-1), and may include all or a portion of additional web-clip widgets (e.g., 149-6-2). The displayed portion is scrolled in response to detecting a gesture on the touch screen display, such as a swipe gesture 3962, in accordance with operations 6840 and 6850 of process 6800 (FIG. 6F)

UI 3900L (FIG. 5L) is a UI for displaying a web-clip widget (e.g., 149-6-2) in accordance with some embodiments. In response to detecting a gesture on the touch screen display, display of the web-clip widget is ceased and another web-clip widget is displayed, in accordance with operations 6940 and 6950 of process 6900 (FIG. 6G). For example, in response to detecting a downward swipe 3962 or a tap gesture 3964 at the top of the displayed widget 149-6-2, a previous user-created widget 149-6-1 is displayed. In response to detecting an upward swipe 3962 or a tap gesture 3966 at the bottom of the displayed widget 149-6-2, a next user-created widget 149-6-3 is displayed.

FIG. 6A is a flow diagram illustrating a process 6000 for creating a web-clip widget from a web page or portion thereof in accordance with some embodiments. While the web-clip widget creation process 6000 described below includes a number of operations that appear to occur in a specific order, it should be apparent that the process 6000 can include more or fewer operations, which can be executed serially or in parallel (e.g., using parallel processors or a multi-threading environment), an order of two or more operations may be changed and/or two or more operations may be combined into a single operation. For example, detection of one or more finger gestures to select and/or scale an area in the web page or portion thereof for display in the widget (6100 and/or 6120) may occur prior to detecting an activation of a widget creation icon (6040), as described above with regard to FIGS. 5A and 5C.

A web page or portion thereof is displayed on a touch screen display of a portable multifunction device (6020), such as portable multifunction device 100. Activation of a widget creation icon is detected (6040). For example, a finger gesture, such as a tap gesture, is detected on the widget creation icon (6060). An example of a widget creation icon is icon 3924 in UI 3900A (FIG. 5A).

In some embodiments, the web-clip widget creation icon is an indicator embedded in the web page to select a corresponding area in the web page or portion thereof for use by the web-clip widget. As described in U.S. patent application Ser. No. 11/760,658, "Creating Web Clips," filed on Jun. 8, 2007, which application is incorporated by reference herein in its entirety, an indicator can be implemented next to potential areas of interest in the web page. Creation of a web-clip widget corresponding to an area of interest in the web page is initiated upon detecting activation of a corresponding indicator (e.g., upon detecting a gesture on the indicator). In some embodiments, the indicator is a button icon displayed in the web page.

In response to detecting activation of the widget creation icon, a widget is created from the web page or portion thereof (6080). In some embodiments, creating the widget comprises detecting one or more finger gestures to select an area in the web page or portion thereof for use in the widget (6100). In some embodiments, creating the widget includes detecting one or more finger gestures to scale an area in the web page or portion thereof for use in the widget (6120). Examples of finger gestures used to select and/or scale an area in the web page or portion thereof include a single tap gesture 3923 or 3925 to center and enlarge a block (FIG. 5A); a single tap gesture 3927 or 3935 to center an adjacent enlarged block; a multi-touch depinching gesture (3931 and 3933) to enlarge the web page; a multi-touch pinching gesture (not shown) to reduce the web page; swipe gestures such as a substantially vertical swipe 3937, an upward or diagonal swipe 3939, and/or other swipe gestures (not shown) to scroll the web page; and/or a multi-touch rotation gesture (3941 and 3943) to select a portrait or landscape view (FIG. 5C).

Figure 5I:
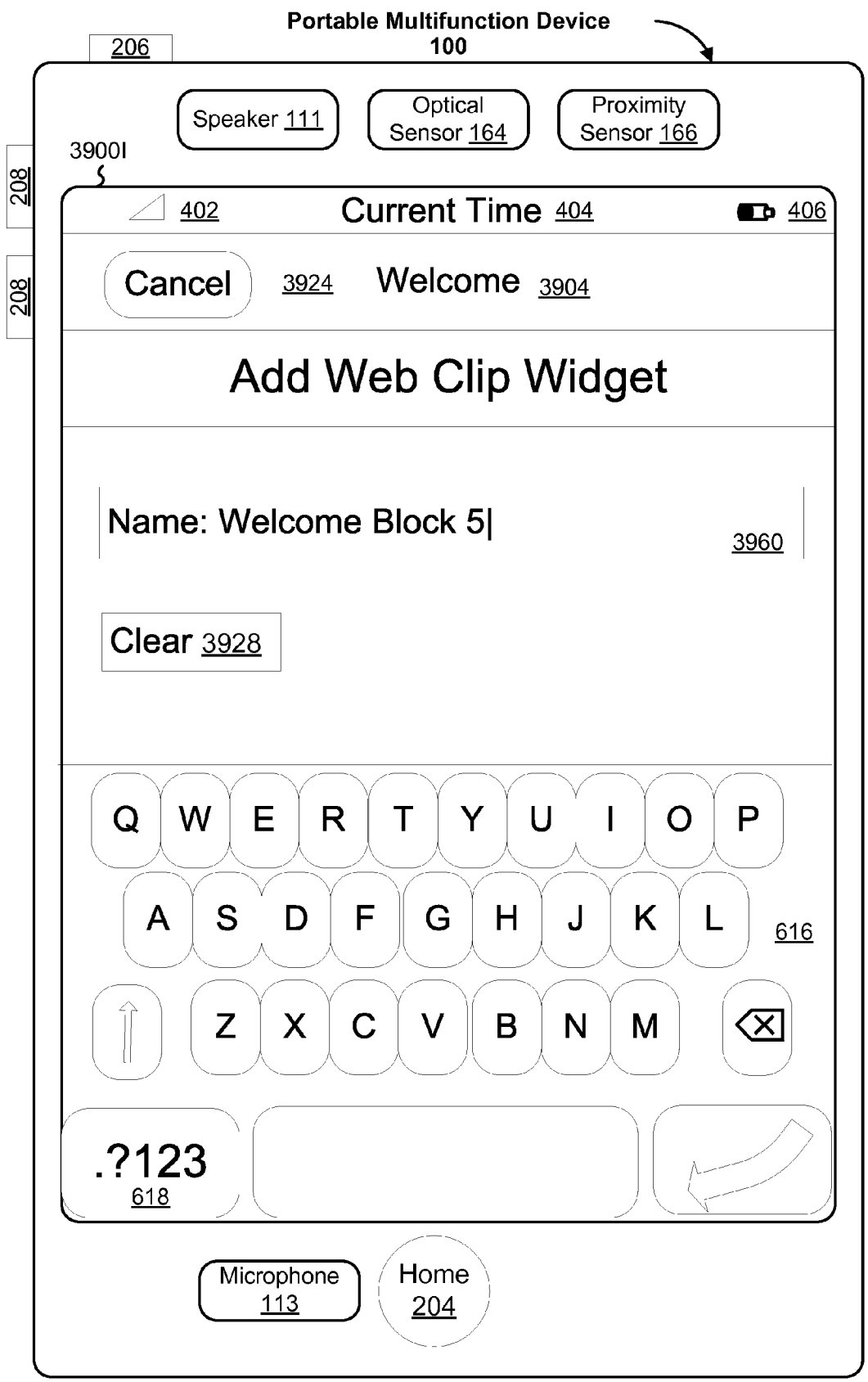
Figure 5J:
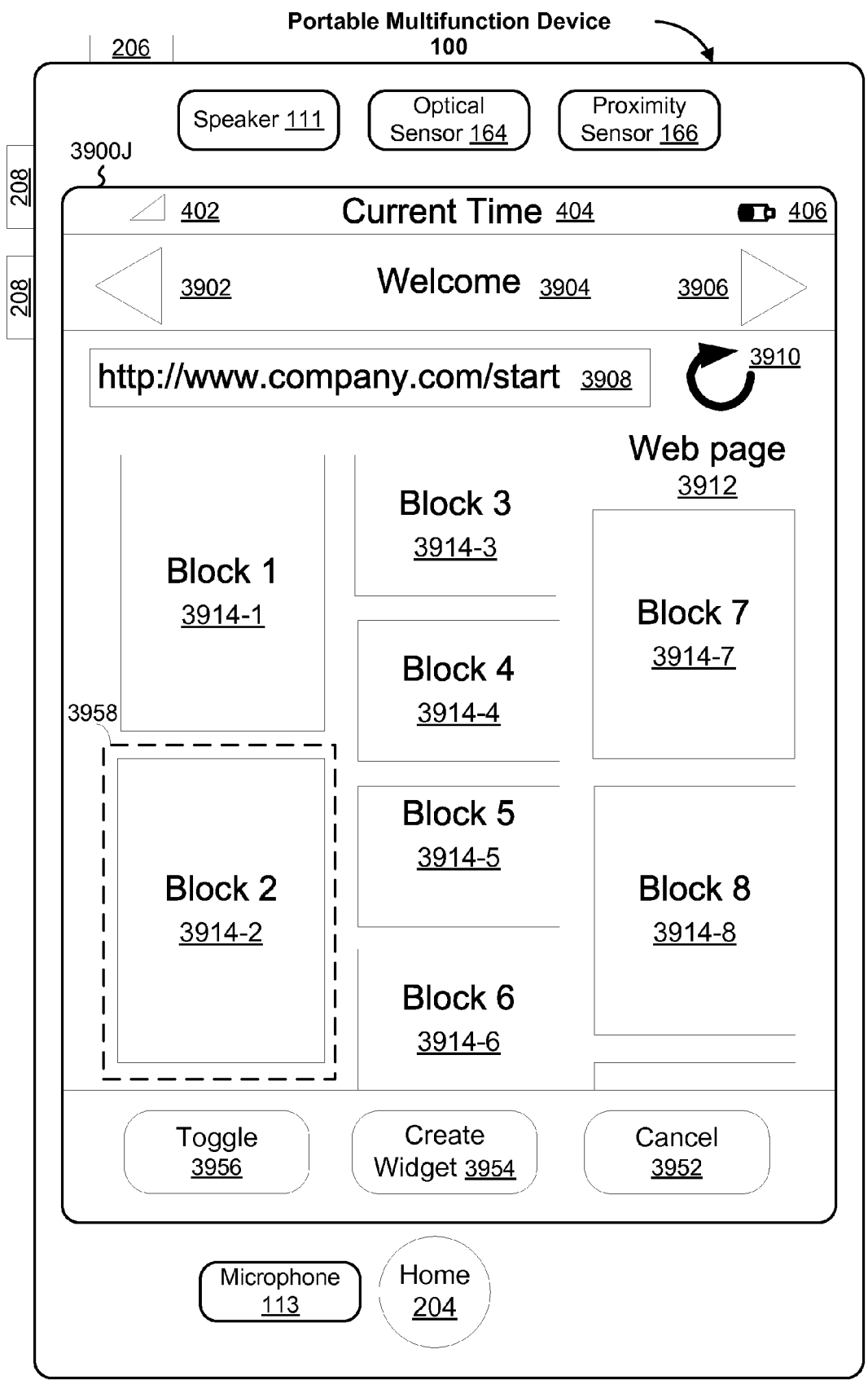
Figure 5K:
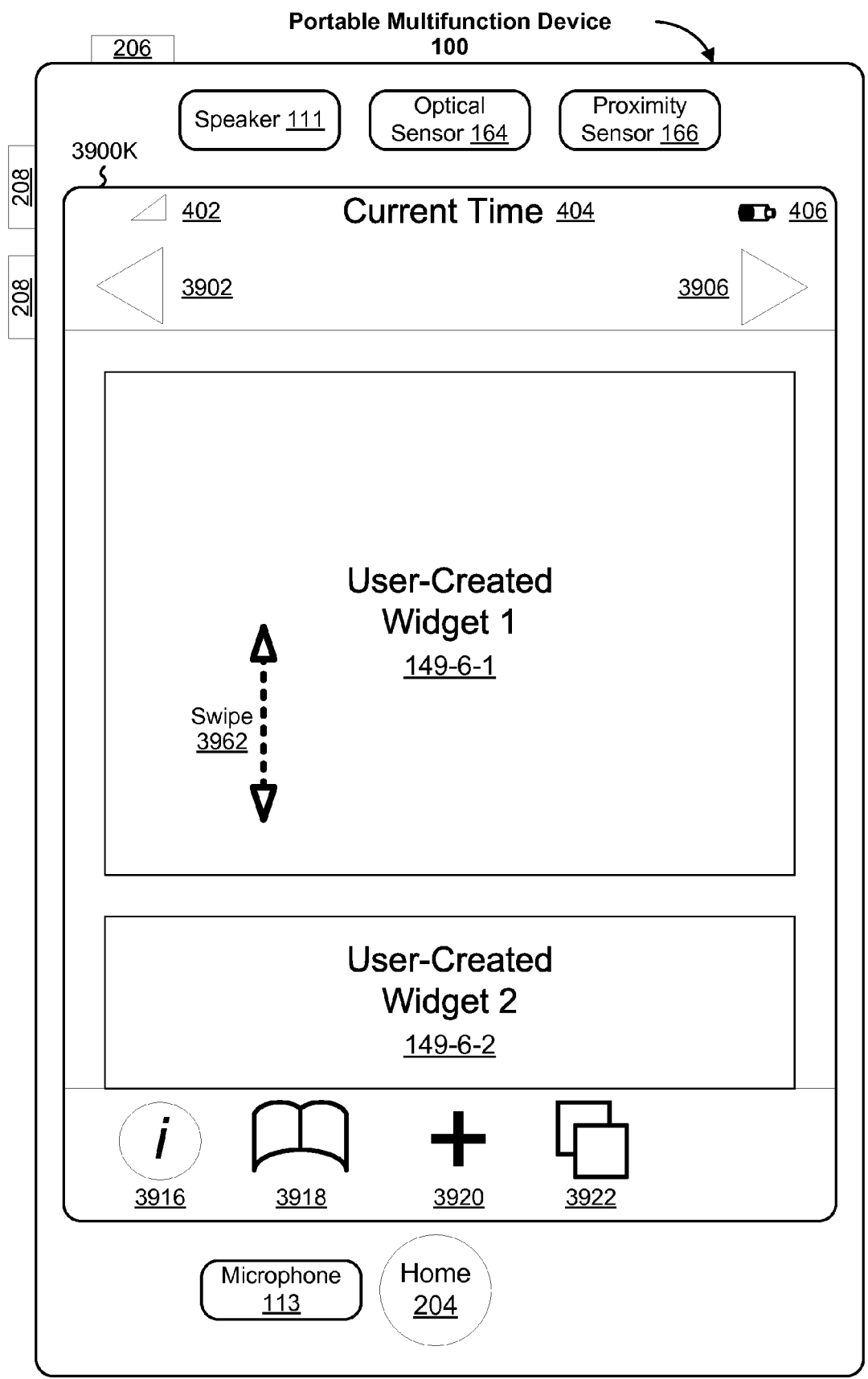
FIGS. 5K and 5L illustrate exemplary user interfaces for displaying web-clip widgets in accordance with some embodiments.
Figure 5L:
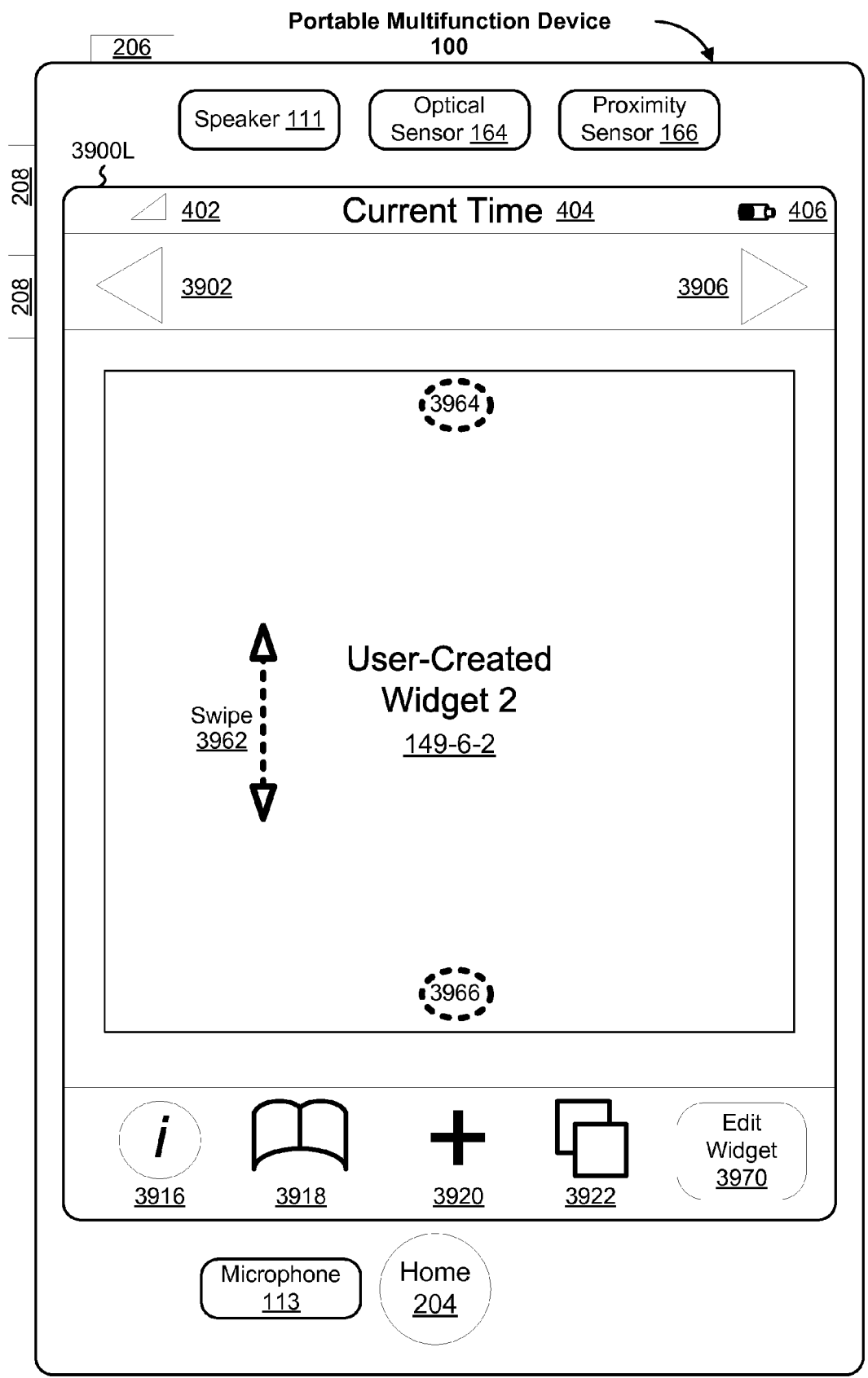

In some embodiments, a name is requested for the widget. The name is received and stored (6140). For example, the name may be requested and received via UI 3900I (FIG. 5I). In some embodiments, an icon is created corresponding to the widget (6160). The icon may be displayed in a menu of icons (e.g., UI 400A or UI 400B, FIG. 4A or 4B) or in a list of icons (e.g., UI 400C, FIG. 4C) (6180). In some embodiments, the menu or list of icons comprises a menu or list of applications and widgets on the multifunction device. In some embodiments, the menu or list of icons comprises a menu or list of widgets on the multifunction device. In some embodiments, the menu or list of icons comprises a menu or list of user-created widgets on the multifunction device.

In some embodiments, the web-clip widget is stored (6200) as a bookmark in a browser application. In some embodiments, as described in U.S. patent application Ser. No. 11/469,838, "Presenting and Managing Clipped Content," filed on Sep. 1, 2006, which application is incorporated by reference herein in its entirety, the web-clip widget is encoded as a URL associated with the bookmark.

In some embodiments, the web-clip widget is sent (6220) to a web server for storage. In some embodiments, the web-clip widget stored on the web server is publicly accessible. Storing a user-created web-clip widget on a publicly accessible server allows the user to share the web-clip widget with other users.

Figure 6B:
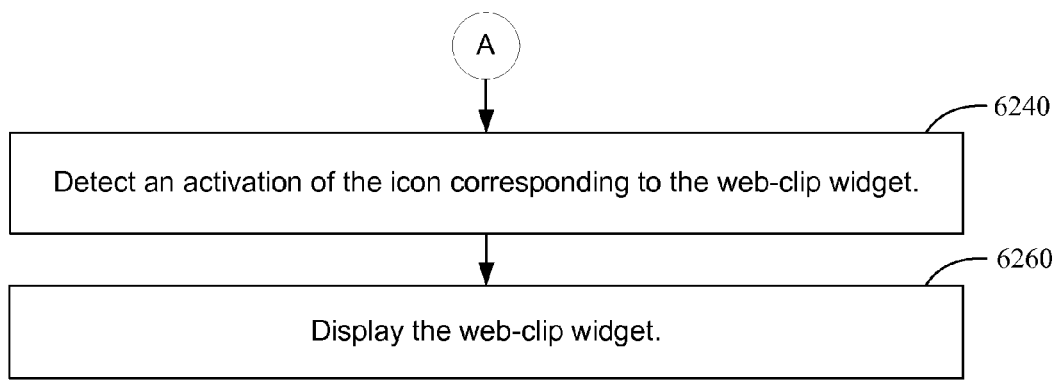

In some embodiments, as illustrated in FIG. 6B, an activation of the icon corresponding to the web-clip widget is detected (6240). For example, a finger gesture (e.g., a tap gesture) is detected on the icon. The web-clip widget is displayed (6260). For example, a user-created widget 149-6-2 is displayed in UI 3900L (FIG. 5L).

Figure 6C:
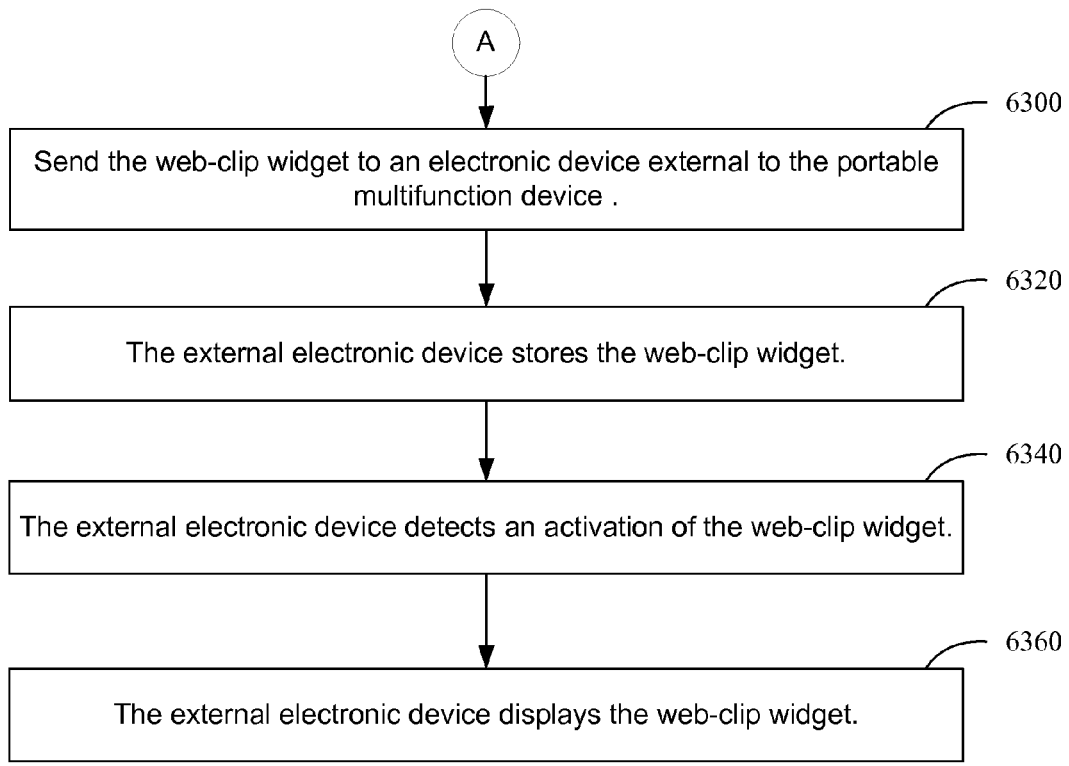

In some embodiments, as illustrated in FIG. 6C, the web-clip widget is sent (6300) to an electronic device external to the portable multifunction device. For example, the web-clip widget may be sent to another portable multifunction device 100. The external electronic device stores (6320) the web-clip widget, detects an activation (6340) of the web-clip widget, and displays the web-clip widget (6360). In some embodiments, the web-clip widget is sent to the external electronic device via email. In some embodiments, the web-clip widget is sent to the external electronic device via instant messaging. As used herein, "instant messaging" refers to both telephony-based messages (e.g., messages sent using Short Message Service (SMS) or Multimedia Message Service (MMS)) and Internet-based messages (e.g., messages sent using Extensible Messaging and Presence Protocol (XMPP), Session Initiation Protocol for Instant Messaging and Presence Leveraging Extensions (SIMPLE), or Instant Messaging and Presence Service (IMPS)). Sending a user-created web-clip widget to another electronic device provides the user with a way to share the web-clip widget with other users.

Figure 6D:
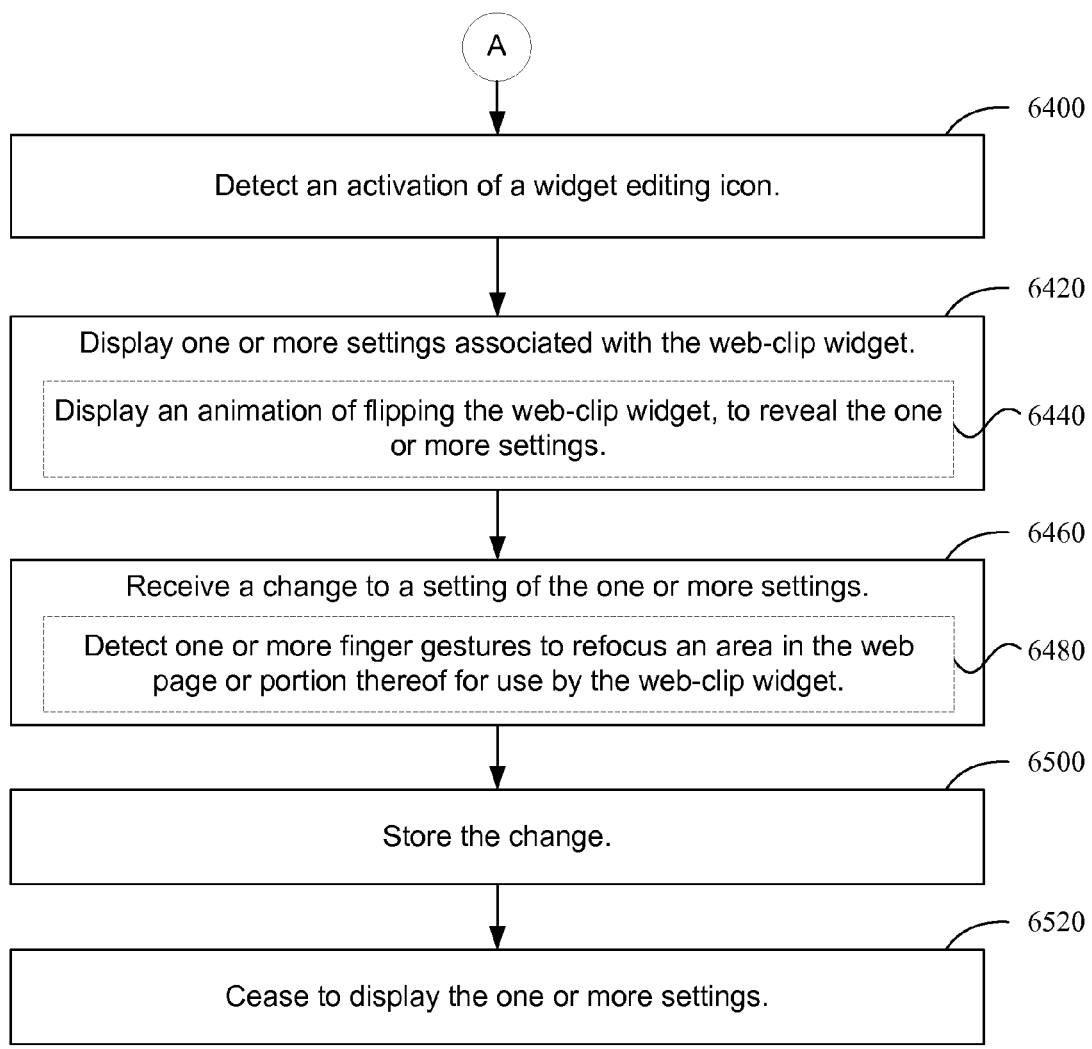
Figure 6E:
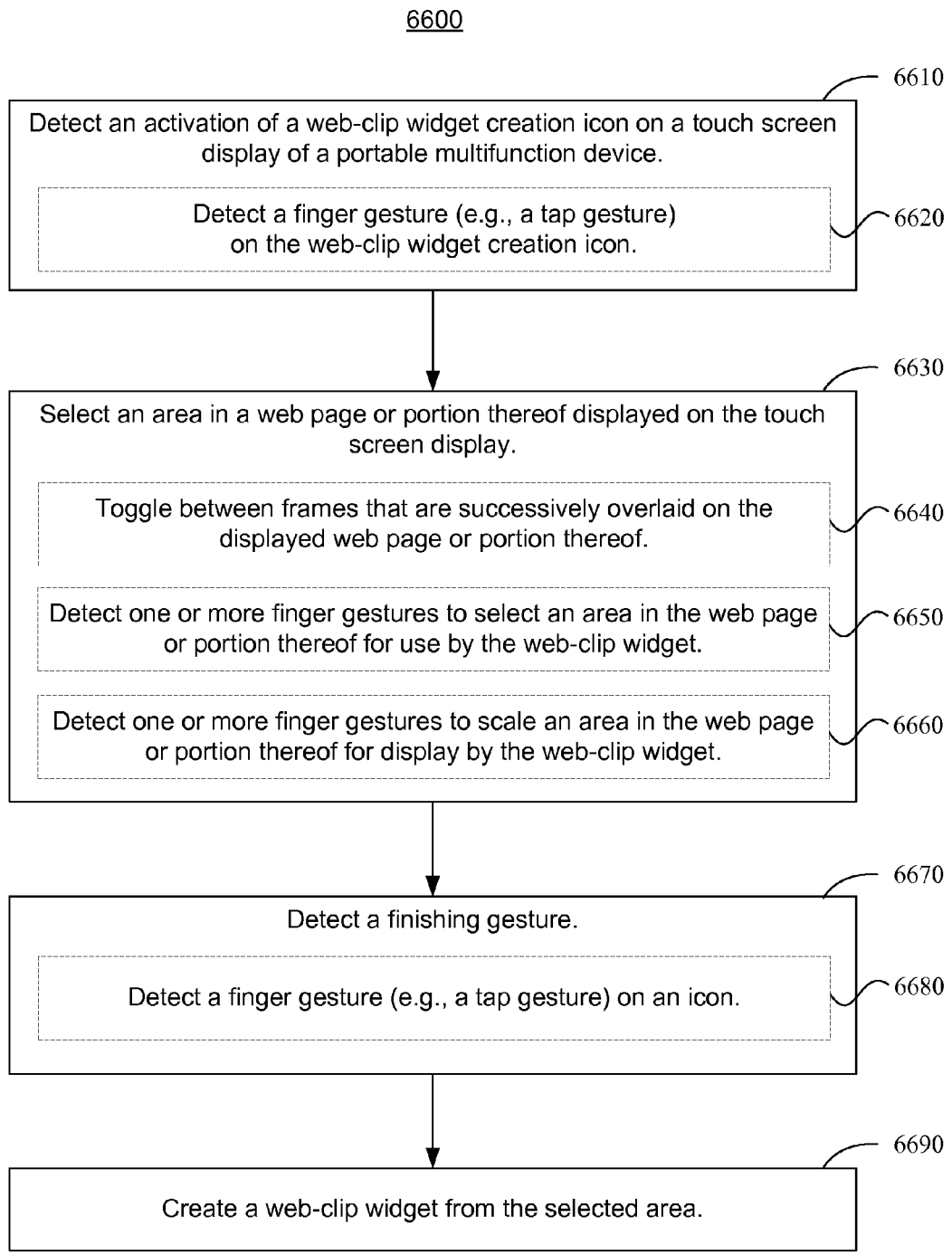
Figure 6F:
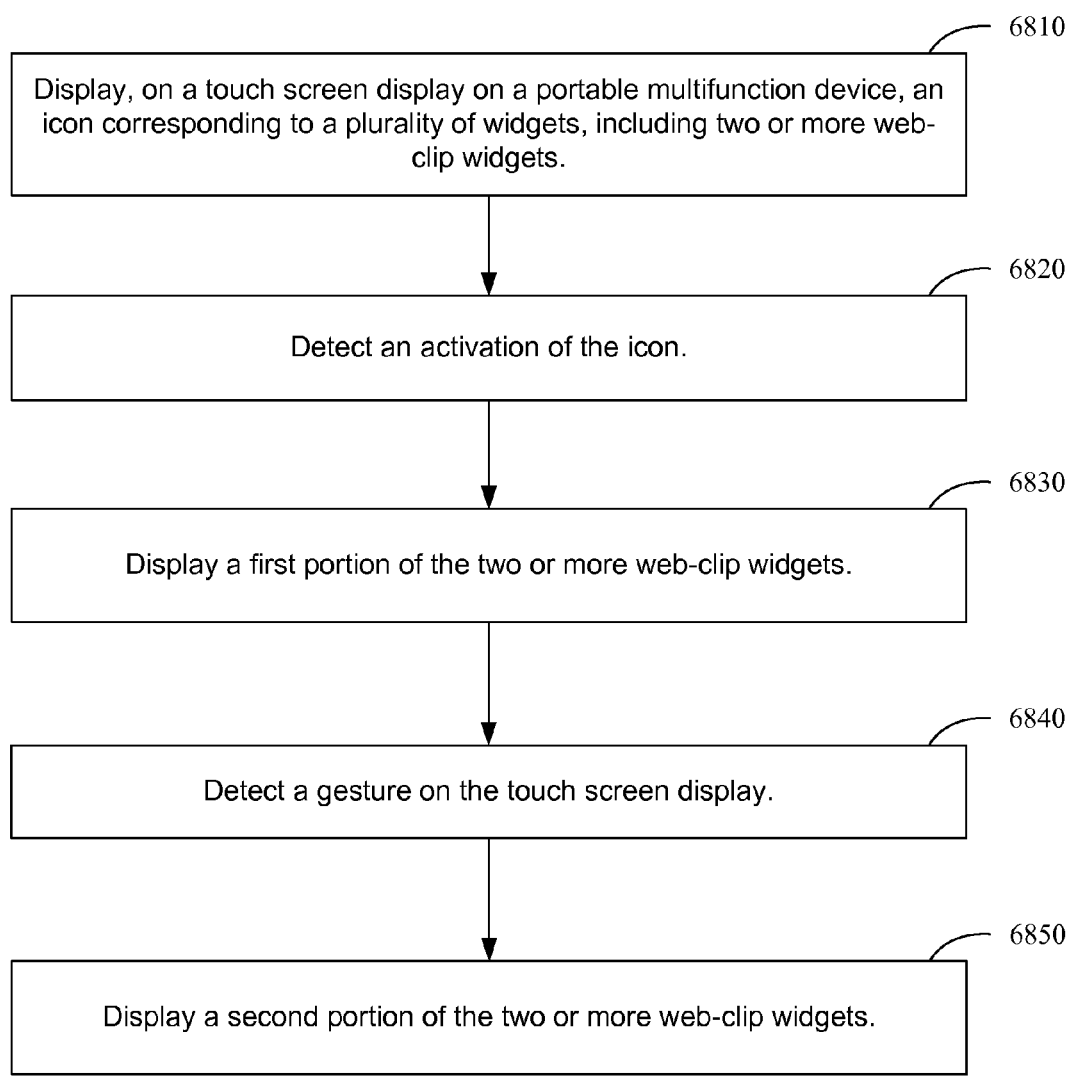
FIGS. 6F and 6G are flow diagrams illustrating processes for displaying web-clip widgets in accordance with some embodiments.
Figure 6G:
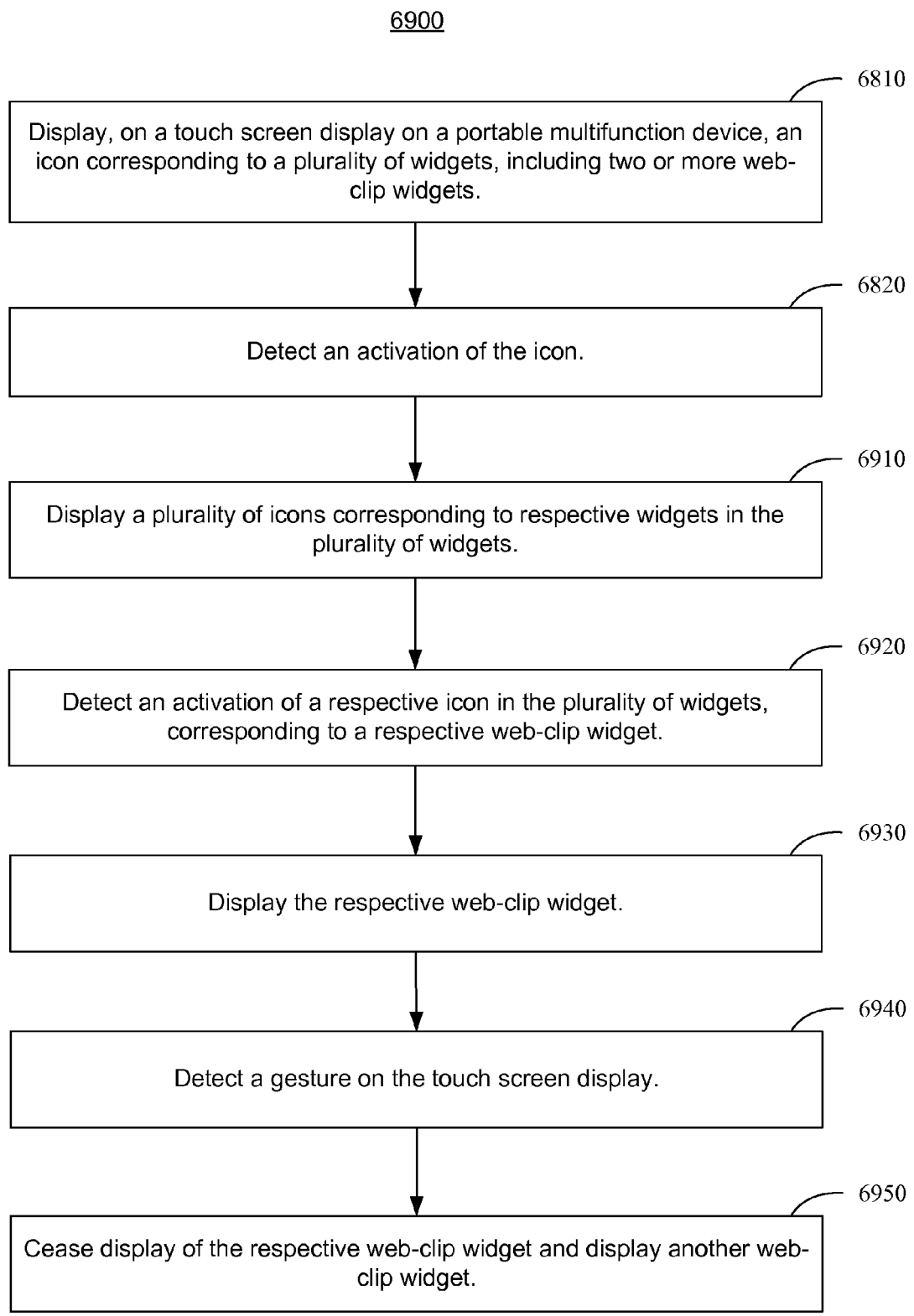

In some embodiments, as illustrated in FIG. 6D, an activation of a widget editing icon (e.g., edit widget icon 3970, FIG. 5L) is detected (6400). In response to detecting the activation of the widget editing icon, one or more settings associated with the web-clip widget are displayed (6420). In some embodiments, an animation is displayed (6440) of flipping the web-clip widget, to reveal the one or more settings. As described in U.S. patent application Ser. No. 11/145,561, "Presenting Clips of Content," filed on Jun. 3, 2005, which application is incorporated by reference herein in its entirety, settings (e.g., preferences) associated with a web-clip widget may be displayed by flipping the widget to reveal a user interface to edit the settings. A change to a setting of the one or more settings is received (6460). For example, one or more finger gestures are detected to refocus (6480) an area in the web-clip or portion thereof for use by the web-clip widget. As described in the "Presenting Clips of Content" application, the user interface revealed by flipping the widget may include a refocus preference to allow redefinition of the selected area of the web page for use by the web-clip widget. The change is stored (6500) and display of the one or more settings is ceased (6520).

In some embodiments, each operation of process 6000 is performed by a portable multifunction device. In some embodiments, however, one or more operations of process 6000 are performed by a server system in communication with a portable multifunction device via a network connection. The portable multifunction device may transmit data associated with the widget creation process to the server system and may receive information corresponding to the widget in return. For example, code (e.g., an HTML file, a CSS file, and/or a Javascript file, in accordance with some embodiments, or an XML file and/or a Javascript file, in accordance with some other embodiments) associated with the widget may be generated by the server system and then transmitted to the portable multifunction device. In general, operations in the widget creation process may be performed by the portable multifunction device, by the server system, or by a combination thereof.

Process 6000 creates a widget that allows a user to view a specified area in a web page upon activation of the widget. The user thus is spared from having to enlarge and center the area of the web page that is of interest, such as a particular block of interest, each time the user visits the web page.

FIG. 6E is a flow diagram illustrating a process 6600 for creating a web-clip widget from a web page or portion thereof in accordance with some embodiments. While the web-clip widget creation process 6600 described below includes a number of operations that appear to occur in a specific order, it should be apparent that the process 6600 can include more or fewer operations, which can be executed serially or in parallel (e.g., using parallel processors or a multi-threading environment), an order of two or more operations may be changed and/or two or more operations may be combined into a single operation.

On a touch screen display of a portable multifunction device, an activation of a web-clip widget creation icon (e.g., icon 3924, FIG. 5A) is detected (6610). In some embodiments, a finger gesture (e.g., a tap gesture) is detected (6620) on the web-clip widget creation icon.

An area in a web page or portion thereof displayed on the touch screen display is selected (6630). In some embodiments, selecting the area includes toggling (6640) between frames that are successively overlaid on the displayed web page or portion thereof. For example, in UI 3900J (FIG. 5J), a frame 3958 is displayed overlaid on the web page 3912 such that it frames block 2 3914-2. Upon activation of a toggle icon 3956, display of the frame 3958 is ceased and another frame is displayed overlaid on the web page 3912 such that it frames another block (e.g., block 3 3914-3). Thus, in some embodiments, the frames successively highlight blocks and other structural elements of the web page. As described in U.S. patent application Ser. No. 11/620,492, "Selecting and Manipulating Web Content," filed on Jan. 5, 2007, which application is incorporated by reference herein in its entirety, structural elements that are displayed in a web page can be identified during the web-clip widget creation process.

In some embodiments, selecting the area includes detecting (6650) one or more finger gestures to select an area in the web page or portion thereof for use by the web-clip widget. In some embodiments, selecting the area includes detecting (6660) one or more finger gestures to scale an area in the web page or portion thereof for display by the web-clip widget. Examples of finger gestures used to select and/or scale an area in the web page or portion thereof include a single tap gesture 3923 or 3925 to center and enlarge a block (FIG. 5A); a single tap gesture 3927 or 3935 to center an adjacent enlarged block; a multi-touch depinching gesture (3931 and 3933) to enlarge the web page; a multi-touch pinching gesture (not shown) to reduce the web page; swipe gestures such as a substantially vertical swipe 3937, an upward or diagonal swipe 3939, and/or other swipe gestures (not shown) to scroll the web page; and/or a multi-touch rotation gesture (3941 and 3943) to select a portrait or landscape view (FIG. 5C).

A finishing gesture is detected (6670). In some embodiments, a finger gesture (e.g., a tap gesture) on an icon (e.g., create widget icon 3954, FIG. 5J) is detected (6680). A web-clip widget is created (6690) from the selected area.

In some embodiments, creating the web-clip widget includes requesting a name for the web-clip widget, receiving the name, and storing the name, in accordance with operation 6140 of process 6000 (FIG. 6A).

In some embodiments, creating the web-clip widget includes creating an icon corresponding to the web-clip widget, in accordance with operation 6160 of process 6000. In some embodiments, the icon corresponding to the web-clip widget is displayed in a menu or list of icons, in accordance with operation 6180 of process 6000. In some embodiments, the menu or list of icons comprises a menu or list of applications and widgets on the multifunction device. In some embodiments, the menu or list of icons comprises a menu or list of widgets on the multifunction device. In some embodiments, the menu or list of icons comprises a menu or list of user-created widgets on the multifunction device.

In some embodiments, an activation of the icon corresponding to the web-clip widget is detected and the web-clip widget is displayed, in accordance with operations 6240 and 6260 (FIG. 6B) of process 6000.

In some embodiments, settings associated with the web-clip widget are edited, in accordance with operations 6400-6520 (FIG. 6D) of process 6000.

In some embodiments, the web-clip widget is stored as a bookmark in a browser application, in accordance with operation 6200 of process 6000 (FIG. 6A).

In some embodiments, the web-clip widget is sent to a web server for storage, in accordance with operation 6220 of process 6000. In some embodiments, the web-clip widget is sent to an external electronic device, in accordance with operations 6300-6360 (FIG. 6C) of process 6000.

In some embodiments, each operation of process 6600 is performed by a portable multifunction device. In some embodiments, however, one or more operations of process 6600 are performed by a server system in communication with a portable multifunction device via a network connection. The portable multifunction device may transmit data associated with the widget creation process to the server system and may receive information corresponding to the widget in return. For example, code (e.g., an HTML file, a CSS file, and/or a Javascript file, in accordance with some embodiments, or an XML file and/or a Javascript file, in accordance with some other embodiments) associated with the widget may be generated by the server system and then transmitted to the portable multifunction device. In general, operations in the widget creation process may be performed by the portable multifunction device, by the server system, or by a combination thereof.

Process 6600, like process 6000, creates a widget that allows a user to view a specified area in a web page upon activation of the widget, thus sparing the user from having to enlarge and center the area of the web page that is of interest each time the user visits the web page.

FIG. 6F is a flow diagram illustrating a process 6800 for displaying web-clip widgets in accordance with some embodiments. On a touch screen display on a portable multifunction device, an icon is displayed (6810) corresponding to a plurality of widgets, including two or more web-clip widgets. For example, in some embodiments, the icon for user-created widget 149-6 (FIG. 4A) corresponds to multiple widgets including multiple web-clip widgets.

An activation of the icon is detected (6820). For example, a finger gesture (e.g., a tap gesture) on the icon is detected.

In response to detecting the activation, a first portion of the two or more web-clip widgets is displayed (6830). For example, UI 3900K (FIG. 5K) displays a first portion that includes a first user-created widget 149-6-1 and a portion of a second user-created widget 149-6-2. In another example, UI 3900L (FIG. 5L) displays a first portion that includes the second user-created widget 149-6-2 and no other widgets or portions thereof. Thus, in some embodiments, the first portion is a first web-clip widget.

A gesture is detected (6840) on the touch screen display. In some embodiments, the gesture is a scrolling gesture. For example, a swipe gesture 3962 (FIGS. 5K and 5L) is detected on the touch screen display.

In response to detecting the gesture, a second portion of the two or more web-clip widgets is displayed (6850). In some embodiments, in response to detecting the gesture, a displayed portion of the two or more web-clip widgets is scrolled from the first portion to the second portion. For example, in response to detecting an upward scroll gesture 3962 in UI 3900K (FIG. 5K), a second portion is displayed that includes more or all of the second user-created widget 149-6-2 and less or none of the first user-created widget 149-6-1. In some embodiments, the second portion is a second web-clip widget (e.g., the second user-created widget 149-6-2).

In some embodiments, the gesture is a de-pinching gesture (e.g., gestures 3931 and 3933, FIG. 5C). In response to detecting the de-pinching gesture, a displayed portion of the two or more web-clip widgets is zoomed in from the first portion to the second portion.

In some embodiments, the gesture is a finger tap on an area within the first portion (e.g., a finger tap analogous to gesture 3923, FIG. 5A), and the displayed second portion is centered on the area and is zoomed in with respect to the first portion.

FIG. 6G is a flow diagram illustrating a process 6900 for displaying web-clip widgets in accordance with some embodiments. On a touch screen display on a portable multifunction device, an icon is displayed (6810) corresponding to a plurality of widgets, including two or more web-clip widgets. For example, in some embodiments, the icon for user-created widget 149-6 (FIG. 4A) corresponds to multiple widgets including multiple web-clip widgets.

An activation of the icon is detected (6820). For example, a finger gesture (e.g., a tap gesture) on the icon is detected.

In response to detecting the activation of the icon, a plurality of icons corresponding to respective widgets in the plurality of widgets is displayed (6910). In some embodiments, the plurality of icons is displayed in a menu, or in a list. For example, UI 400B (FIG. 4B) displays a menu of icons corresponding to user-created widgets 149-6-1 through 149-6-6, and UI 400C (FIG. 4C) displays a list of icons corresponding to user-created widgets 149-6-1 through 149-6-6.

An activation is detected (6920) of a respective icon in the plurality of widgets corresponding to a respective web-clip widget. In response to detecting the activation of the respective icon, the respective web-clip widget is displayed (6930). For example, in response to detecting an activation of an icon corresponding to user-created widget 149-6-2 in UI 400B or UI 400C, user-created widget 149-6-2 is displayed in UI 3900L (FIG. 5L).

A gesture is detected (6940) on the touch screen display. For example, a swipe gesture 3962 (FIG. 5L) is detected on the touch screen display. Alternately, a tap gesture 3964 at the top or a tap gesture 3966 at the bottom of the displayed widget 149-6-2 is detected.

In response to detecting the gesture, display of the respective web-clip widget is ceased and another web-clip widget is displayed (6950). For example, in response to detecting a downward swipe 3962 or a tap gesture 3964 at the top of the displayed widget 149-6-2, a previous user-created widget 149-6-1 is displayed. In response to detecting an upward swipe 3962 or a tap gesture 3966 at the bottom of the displayed widget 149-6-2, a next user-created widget 149-6-3 is displayed.

Processes 6800 and 6900 thus provide user-friendly ways to view multiple specified areas in web pages without having to surf between successive web pages and without having to enlarge and center an area of interest in each web page.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at a portable electronic device with a touch screen display:
   displaying a web page or portion thereof on the touch screen display;
   detecting an activation of a web-clip widget creation icon; and,
   in response to detecting the activation, creating a web-clip widget from the web page or portion thereof, wherein the web-clip widget comprises an area in the web page or portion thereof scaled in response to detecting one or more finger gestures; and
   sending the web-clip widget to an electronic device external to the portable electronic device.

2. The method of claim 1, wherein the electronic device is a web server and the web-clip widget is for storage at the web server.

3. The method of claim 2, wherein the web-clip widget stored on the web server is publicly accessible.

4. The method of claim 1, wherein the external electronic device stores the web-clip widget, detects an activation of the web-clip widget, and, in response to detecting the activation of the web-clip widget, displays the web-clip widget.

5. The method of claim 1, wherein sending the web-clip widget to the external electronic device is performed via email.

6. The method of claim 1, wherein sending the web-clip widget to the external electronic device is performed via instant messaging.

7. The method of claim 6, wherein the instant messaging uses Short Message Service (SMS).

8. A portable electronic device, comprising:
   a touch screen display;
   one or more processors;
   memory; and
   one or more programs, wherein the one or more programs are stored in the memory and configured to be executed by the one or more processors, the one or more programs including instructions for:
   displaying a web page or portion thereof on the touch screen display;
   detecting an activation of a web-clip widget creation icon; and,
   in response to detecting the activation, creating a web-clip widget from the web page or portion thereof, wherein the web-clip widget comprises an area in the web page or portion thereof scaled in response to detecting one or more finger gestures; and
   sending the web-clip widget to an electronic device external to the portable electronic device.

9. The device of claim 8, wherein the electronic device is a web server and the web-clip widget is for storage at the web server.

10. The device of claim 9, wherein the web-clip widget stored on the web server is publicly accessible.

11. The device of claim 8, wherein the external electronic device stores the web-clip widget, detects an activation of the web-clip widget, and, in response to detecting the activation of the web-clip widget, displays the web-clip widget.

12. The device of claim 8, wherein sending the web-clip widget to the external electronic device is performed via email.

13. The device of claim 8, wherein sending the web-clip widget to the external electronic device is performed via instant messaging.

14. The device of claim 13, wherein the instant messaging uses Short Message Service (SMS).

15. A non-transitory computer readable storage medium storing one or more programs, the one or more programs comprising instructions, which when executed by a portable electronic device with a touch screen display, cause the device to:
    display a web page or portion thereof on the touch screen display;
    detect an activation of a web-clip widget creation icon; and, in response to detecting the activation, create a web-clip widget from the web page or portion thereof, wherein the web-clip widget comprises an area in the web page or portion thereof scaled in response to detecting one or more finger gestures; and
    send the web-clip widget to an electronic device external to the portable electronic device.

16. The computer readable storage medium of claim 15, wherein the electronic device is a web server and the web-clip widget is for storage at the web server.

17. The computer readable storage medium of claim 16, wherein the web-clip widget stored on the web server is publicly accessible.

18. The computer readable storage medium of claim 15, wherein the external electronic device stores the web-clip widget, detects an activation of the web-clip widget, and, in response to detecting the activation of the web-clip widget, displays the web-clip widget.

19. The computer readable storage medium of claim 15, wherein sending the web-clip widget to the external electronic device is performed via email.

20. The computer readable storage medium of claim 15, wherein sending the web-clip widget to the external electronic device is performed via instant messaging.

21. The computer readable storage medium of claim 20, wherein the instant messaging uses Short Message Service (SMS).

* * * * *